United States Patent
Choi et al.

(10) Patent No.: US 9,974,053 B2
(45) Date of Patent: May 15, 2018

(54) METHOD AND APPARATUS FOR ALLOCATING WIRELESS RESOURCES ACCORDING TO RESOURCE ALLOCATION SETTING IN WLAN

(71) Applicant: LG ELECTRONICS INC., Seoul (KR)

(72) Inventors: Jinsoo Choi, Seoul (KR); Hangyu Cho, Seoul (KR); Wookbong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/517,110

(22) PCT Filed: Oct. 12, 2015

(86) PCT No.: PCT/KR2015/010734
§ 371 (c)(1),
(2) Date: Apr. 5, 2017

(87) PCT Pub. No.: WO2016/056878
PCT Pub. Date: Apr. 14, 2016

(65) Prior Publication Data
US 2017/0303242 A1    Oct. 19, 2017

Related U.S. Application Data

(60) Provisional application No. 62/062,135, filed on Oct. 9, 2014, provisional application No. 62/067,982, filed
(Continued)

(51) Int. Cl.
*H04W 4/00* (2018.01)
*H04W 72/04* (2009.01)
*H04W 84/12* (2009.01)

(52) U.S. Cl.
CPC .......... *H04W 72/04* (2013.01); *H04W 84/12* (2013.01)

(58) Field of Classification Search
CPC ......... H04B 7/022; H04L 1/0071; H04L 1/06; H04L 27/2601; H04L 5/0007;
(Continued)

(56) References Cited

U.S. PATENT DOCUMENTS

2006/0050742 A1\* 3/2006 Grandhi ............ H04W 74/0816
370/506
2007/0117569 A1   5/2007 Ovadia et al.
(Continued)

FOREIGN PATENT DOCUMENTS

WO    WO 2011/108832 A2    9/2011

*Primary Examiner* — Minh-Trang Nguyen
(74) *Attorney, Agent, or Firm* — Birch, Stewart, Kolasch & Birch, LLP

(57) ABSTRACT

Disclosed are a method and an apparatus for allocating wireless resource according to a resource allocation setting in a WLAN. The method for allocating wireless resources according to the resource allocation setting, in a WLAN, may comprise the steps of: an AP transmitting, to a plurality of STAs, resource allocation setting information; the AP allocating, to each of the plurality of STAs, each of the plurality of wireless resources in first resource units or second resource units, based on the resource allocation setting information; the AP transmitting to each of the plurality of STAs, through each of the plurality of wireless resources, each of a plurality of items of downlink data; and the AP receiving, from each of the plurality of STAs, channel feedback information for each of the plurality of wireless resources.

10 Claims, 12 Drawing Sheets

Related U.S. Application Data on Oct. 24, 2014, provisional application No. 62/069,336, filed on Oct. 28, 2014, provisional application No. 62/069,844, filed on Oct. 29, 2014, provisional application No. 62/072,955, filed on Oct. 30, 2014.

(58) Field of Classification Search
CPC ... H04L 5/0037; H04L 5/0044; H04L 5/0053; H04W 48/12
See application file for complete search history.

(56) References Cited

U.S. PATENT DOCUMENTS

| | | |
|---|---|---|
| 2012/0327915 A1 | 12/2012 | Kang et al. |
| 2013/0286959 A1 | 10/2013 | Lou et al. |
| 2014/0126504 A1 | 5/2014 | Jung et al. |
| 2014/0140311 A1 | 5/2014 | Lee et al. |
| 2016/0057754 A1* | 2/2016 | Azizi .................... H04W 28/20 370/329 |
| 2016/0080043 A1* | 3/2016 | Tian ....................... H04B 7/022 375/267 |
| 2016/0088600 A1* | 3/2016 | Yang .................. H04W 72/044 370/329 |

* cited by examiner

FIG. 1
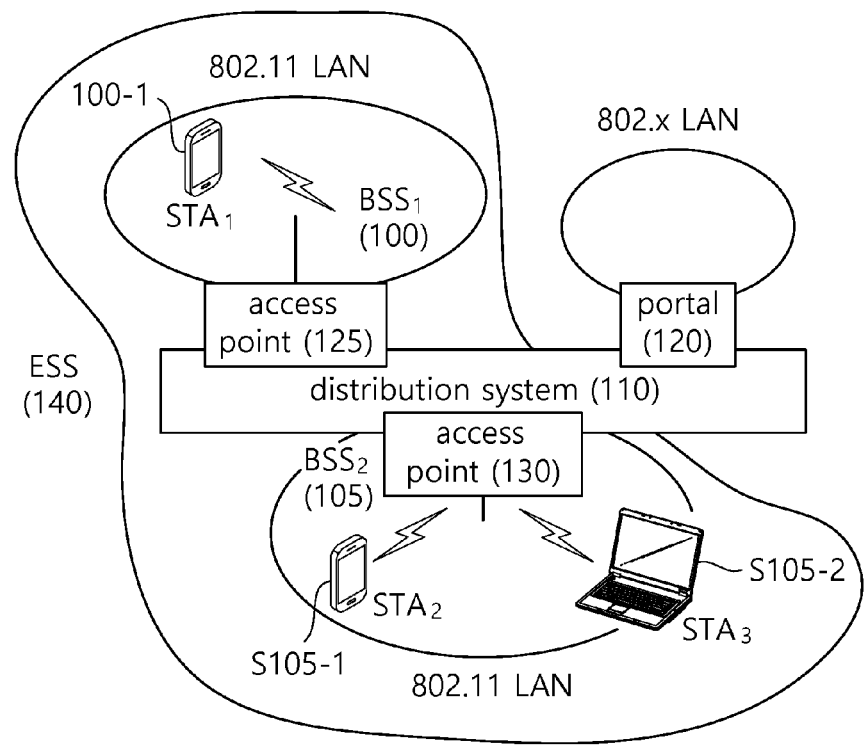
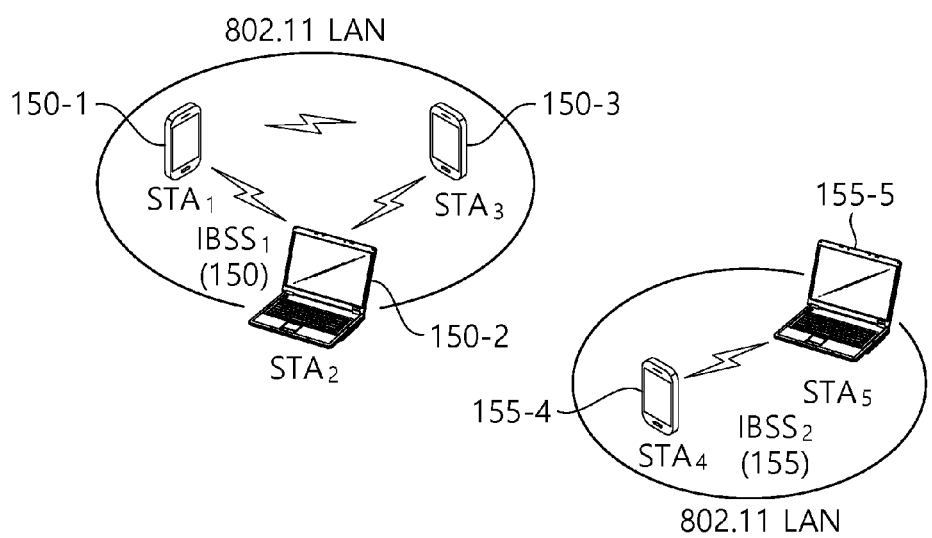

FIG. 3
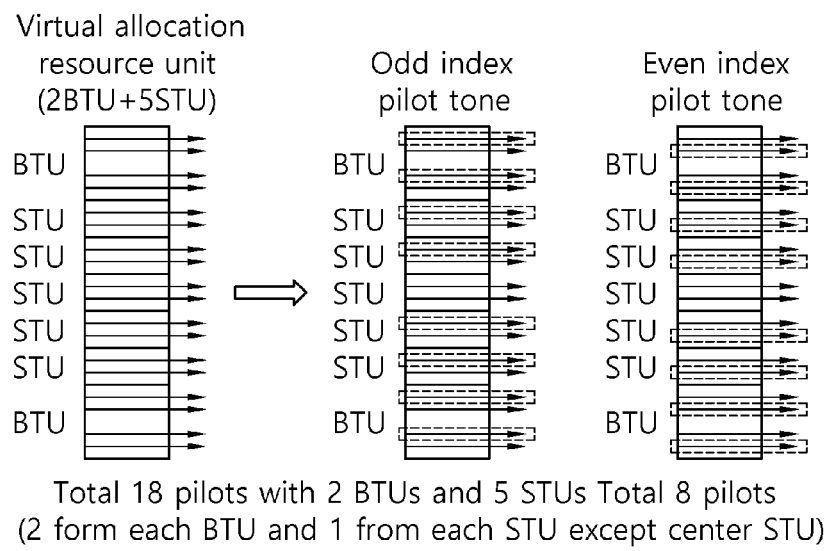
Total 18 pilots with 2 BTUs and 5 STUs Total 8 pilots
(2 form each BTU and 1 from each STU except center STU)
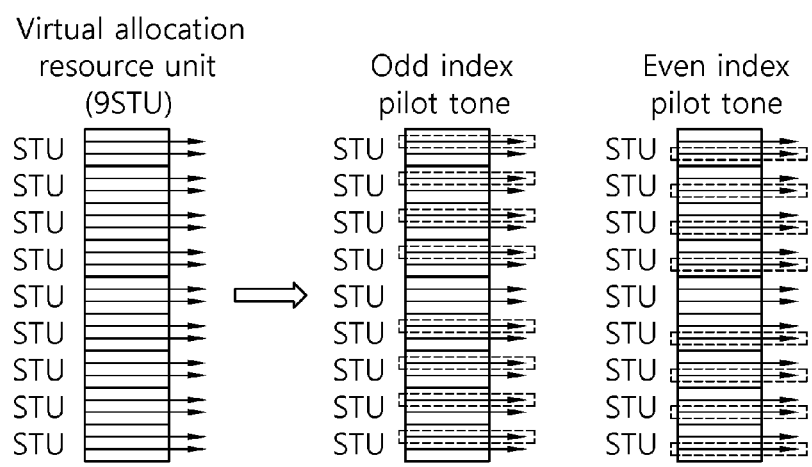

FIG. 4
Virtual allocation resource unit (3BTU+3STU)
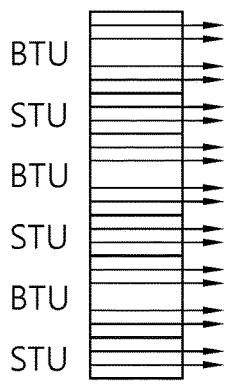
Odd index pilot tone
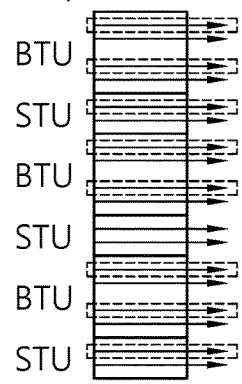
Even index pilot tone
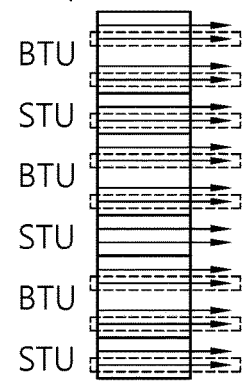
Virtual allocation resource unit (9STU)
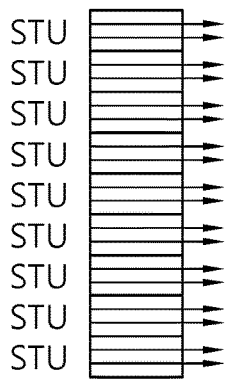
Odd index pilot tone
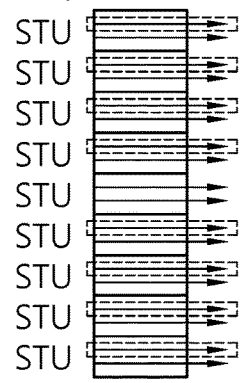
Even index pilot tone
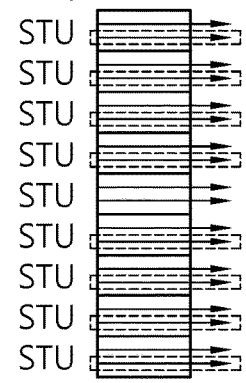

METHOD AND APPARATUS FOR ALLOCATING WIRELESS RESOURCES ACCORDING TO RESOURCE ALLOCATION SETTING IN WLAN

CROSS REFERENCE TO RELATED APPLICATIONS

This application is the National Phase of PCT International Application No. PCT/KR2015/010734, filed on Oct. 12, 2015, which claims priority under 35 U.S.C. 119(e) to U.S. Provisional Application No. 62/062,135, filed on Oct. 9, 2014, 62/067,982, filed on Oct. 24, 2014, 62/069,336, filed on Oct. 28, 2014, 62/069,844, filed on Oct. 29, 2014, and 62/072,955, filed on Oct. 30, 2014, all of which are hereby expressly incorporated by reference into the present application.

BACKGROUND OF THE INVENTION

Field of the Invention

The present invention relates to wireless communication, and more particularly, a method and apparatus for allocating a radio resource according to resource allocation setup to in a wireless local area network (WLAN).

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

The present invention provides a method of allocating a radio resource according to resource allocation setup in a wireless LAN.

The present invention further provides an apparatus that allocates a radio resource according to resource allocation setup in a wireless LAN.

In an aspect, a method of allocating a radio resource according to resource allocation setup in a wireless local area network (WLAN) includes: transmitting, by an access point (AP), resource allocation setup information to a plurality of stations (STAs); allocating, by the AP, a plurality of radio resources to the plurality of STAs, respectively based on first resource units or second resource units based on the resource allocation setup information; transmitting, by the AP, a plurality of downlink data to the plurality of STAs through a plurality of radio resources, respectively; and receiving, by the AP, channel feedback information of the plurality of radio resources from the plurality of STAs, respectively, wherein the resource allocation setup information instructs whether to perform scheduling of each of the plurality of radio resources based on the first resource units or the second resource units, and the second resource units have a size larger than that of the first resource units.

In another aspect, an access point (AP) that allocates a radio resource according to resource allocation setup in a wireless local area network (WLAN) includes: a radio frequency (RF) unit that transmits and receives a wireless signal; and a processor operatively coupled to the RF unit, wherein the processor transmits resource allocation setup information to a plurality of stations (STAs), allocates a plurality of radio resources to the plurality of STAs, respectively based on first resource units or second resource units based on the resource allocation setup information, transmits a plurality of downlink data to the plurality of STAs through a plurality of radio resources, respectively, and receives channel feedback information of the plurality of radio resources from the plurality of STAs, respectively, the resource allocation setup information instructs whether to perform scheduling of each of the plurality of radio resources based on the first resource units or the second resource units, and the second resource units have a size larger than that of the first resource units.

Advantageous Effects

Resource allocation can be performed to each of a plurality of STAs using a radio resource unit defined to different sizes upon allocating a radio resource for each of a plurality of STAs based on orthogonal frequency division multiple access (OFDMA). Therefore, scheduling flexibility can be enhanced and throughput of a wireless LAN can increase.

BRIEF DESCRIPTION OF THE DRAWINGS

FIG. 1 is a conceptual diagram illustrating a structure of a wireless local area network (WLAN).

FIG. 3 is a conceptual diagram illustrating a method of allocating pilot tones of virtual allocation resource units according to an exemplary embodiment of the present invention.

FIG. 4 is a conceptual diagram illustrating a method of allocating pilot tones of virtual allocation resource units according to an exemplary embodiment of the present invention.

DETAILED DESCRIPTION OF THE INVENTION

Figure 2:
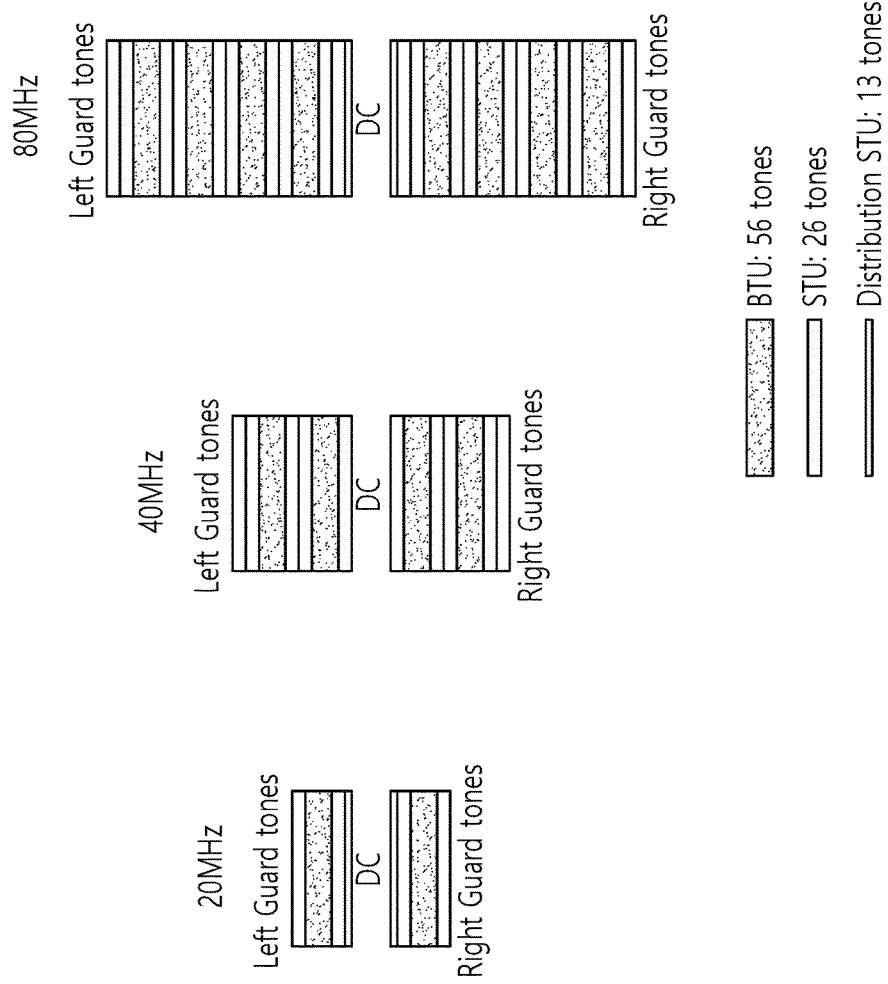
FIG. 2 is a conceptual diagram illustrating a method of allocating a resource according to an exemplary embodiment of the present invention.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the 1 BSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the conventional wireless LAN system, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In the wireless LAN system according to the embodiment, an orthogonal frequency division multiple access (OFDMA) based transmission method is supported for the uplink transmission and/or downlink transmission. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs) (alternatively, basic tone units or small tone units). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

An example of a time-frequency structure, which is assumed in the Wireless LAN system according to this exemplary embodiment may be as described below.

A fast fourier transform (FFT) size/inverse fast fourier transform (IFFT) size may be defined as N-times (wherein N is an integer, e.g., N=4) of the FFT/IFFT sizes that were used in the legacy WirelessLAN system. More specifically, as compared with the first part of the HE PPDU, the 4-times size of the FFT/IFFT may be applied to the second part of the HE PPDU. For example, 256 FFT/IFFT may be applied for a 20 MHz bandwidth, 512 FFT/IFFT may be applied for a 40 MHz bandwidth, 1024 FFT/IFFT may be applied for an 80 MHz bandwidth, and 2048 FFT/IFFT may be applied to a continuous 160 MHz bandwidth or a non-continuous 160 MHz bandwidth.

Subcarrier space/spacing may correspond to a 1/N-times size (wherein N is an integer, e.g., when N=4, 78.125 kHz) of the subcarrier spacing that was used in the legacy WirelessLAN system.

An IDFT/DFT length (or valid symbol length) that is based on inverse discrete fourier transform (IDFT)/discrete fourier transform (DFT) (or FFT/IFFT) may correspond to N-times of the IDFT/DFT length in the legacy WirelessLAN system. For example, in the legacy WirelessLAN system, in case the IDFT/DFT length is equal to 3.2 μs and N=4, in the WirelessLAN system according to this exemplary embodiment, the IDFT/DFT length may be equal to 3.2 μs*4(=12.8 μs).

The length of an OFDM symbol may correspond to the IDFT/DFT length having a length of a guard interval (GI) added thereto. The length of the GI may have diverse values, such as 0.4 μs, 0.8 μs, 1.6 μs, 2.4 μs, and 3.2 μs.

When an OFDMA-based resource allocation method according to an embodiment of the present invention is used, the resource allocation unit defined by different sizes may be used. Specifically, a basic tone unit (BTU) and a small tone unit (STU) may be defined for the resource allocation based on the OFDMA.

The AP may determine DL transmission resource and/or UL transmission resource for at least one STA based on such various resource units. The AP may transmit at least one PPDU to at least one STA through the scheduled DL transmission resource. Further, the AP may receive at least one PPDU transmitted by at least one STA through the DL transmission resource.

In comparison with the STU, the BTU may be a relatively larger size resource unit. For example, the BTU may be defined as the size of 56 tones, 114 tones or the like. The BTU may be defined as the same size irrespective of the size of the available bandwidth (e.g., 20 MHz, 40 MHz, 80 MHz, 160 MHz, etc.) or defined as a size which is changed depending on the size of the available bandwidth. For example, the size of the BTU may be defined as a relatively large value as the size of the available bandwidth increases. The tone may be understood as the same as the subcarrier.

In comparison with the BTU, the STU may be a relatively small size resource unit. For example, the STU may be defined as the size of 26 tones.

Resource units such as BTU and STU may be allocated on the entire bandwidth (or available bandwidth) in consideration of the left guard tone and the right guard tone which are located at both ends of the entire bandwidth and are used to reduce interference, and the direct current (DC) tone located in the center of the entire bandwidth. Further, the resource units such as BTU and STU may be allocated in consideration of a leftover tone which may be used for user allocation separation (or resource allocation for each STA), a common pilot, an automatic gain control (AGC), a phase tracking, etc.

In the entire bandwidth, the allocation method (allocated number, allocation location, etc) of the resource units such as BTU and STU on the entire bandwidth may be set in consideration of the resource utilization efficiency and the scalability (or extensibility) according to the entire bandwidth. The allocation method of resource units such as BTU and STU may defined in advance or signaled based on various methods (e.g., a signaling based on a signal field included in the PPDU header of the PPDU).

Hereinafter, a specific resource allocation method based on BTU and STU will be described.

FIG. 2 is a conceptual view illustrating a method of allocating wireless resources according to an embodiment of the present invention.

FIG. 2 discloses resource allocation for all available bandwidths based on BTU and STU.

Table 1 below discloses the basic resource allocation of BTU and STU on bandwidths of 20 MHz, 40 MHz, and 80 MHz.

TABLE 1

|  | 20 MHz | 40 MHz | 80 MHz |
| --- | --- | --- | --- |
| Basic tone unit (BTU) | 56 tones | 56 tones | 56 tones |
| Small tone unit (STU) |  | 26 tones |  |
| Total # of BTUs | 2 | 4 | 8 |
| Total # of STUs | 5 | 10 | 21 |
| Total available tones (except guard/DC tones) | 242 tones | 484 tones | 994 tones |
| Possible # of BTUs allocated to a STA | 1, 2 | 1, 2 | 1, 2, 4 |
| Possible # of STUs allocated to a STA | 1, 2, 4, 5 | 1, 2, 4, 10 | 1, 2, 4, 21 |
| Maximum STA # of allocations | 7 | 14 | 29 |

Referring to FIG. 2 and Table 1, BTU may be defined as 56 tones, and STU may be defined as 26 tones. One STU may be implemented as two divided STUs corresponding to 13 tons based on the DC tone.

2 BTUs and 5 STUs may be allocated for 20 MHz bandwidth including 242 available tones. Further, 4 BTUs and 10 STUs may be allocated for 40 MHz bandwidth including 484 available tones, and 8 BTUs and 21 STUs may be allocated for 80 MHz bandwidth including 994 available tones.

1 or 2 BTUs may be allocated with one STA for 20 MHz bandwidth. Further, 1 or 2 BTUs may be allocated with 1 STA for 40 MHz bandwidth, and 1, 2 or 4 BTUs may be allocated with 1 STA for 80 MHz bandwidth.

1, 2, 4 or 5 STUs may be allocated with 1 STA for 20 MHz bandwidth. The number 5, which is the maximum number of STUs allocatable with 1 STA on 20 MHz bandwidth, may be defined as another value in consideration of the signaling for the number of STUs allocated to one STA. Further, 1, 2, 4 or 10 STUs may be allocated with 1 STA for 40 MHz bandwidth. The number 10, which is the maximum number of STUs allocatable with 1 STA on 40 MHz bandwidth, may be defined as another number in consideration of the signaling for the number of STUs allocated with 1 STA. Further, 1, 2, 4 or 21 STUs may be allocated with 1 STA for 80 MHz bandwidth. The number 21, which is the maximum number of STUs allocatable with 1 STA on 80 MHz bandwidth, may be defined as another value in consideration of the signaling for the number of STUs allocated with 1 STA.

According to an embodiment of the present invention, a virtual allocation resource unit including a tone corresponding to a combination of at least one BTU and at least one STU may be defined, and a resource allocation based on the virtual allocation resource unit may be performed. The resource allocation based on the virtual allocation resource unit may also be called virtualization.

The virtual allocation resource unit may be a resource unit for reutilizing an interleaver size and OFDM numerology of the existing WLAN system. Further, the virtual allocation resource unit may be defined as a resource unit which is greater than that of BTU and STU and corresponds to the tone corresponding to the combination of at least one BTU and at least one STU. For example, the virtual allocation resource unit may be 242 tones which is the combination of 2 BTUs and 5 STUs and 484 tones which is the combination of 4 BTUs and 10 STUs.

Specifically, when 242 tones corresponding to 2 BTUs and 5 STUs are allocated to one STA, the existing pilot allocation and the existing interleaver size may be utilized. Specifically, the pilot tone may be allocated to 8 tones among 242 tones, and the data tone may be allocated to the remaining 234 tones. An interleaving based on the interleaver of 234 size may be performed for the 234 data tones.

In such a case, a data interleaving procedure and a pilot tone insertion procedure may be performed in the same manner as that of the existing STA having been allocated 242 tones. Namely, even when the 242 tone structure is not physically supported, the resource unit of one virtual 242 tones may be allocated to the STA. In such a case, the interleaving procedure which utilizes the existing interleaver of the 234 size and the insertion procedure of the existing pilot tones (8 pilot tones) may be used. Such a 242 tone resource unit may be expressed as the term "virtual allocation resource unit". The virtual allocation resource unit may be 242 tones or a multiple number of 242 tones (e.g., 484, 968, etc.). Further, the size of the virtual allocation resource unit may be determined based on another interleaver size (108, 52, 24, etc.) having been used in the existing WLAN system. Further, the virtual allocation resource unit may be defined as a resource unit greater than that of BTU and STU corresponding to the tone corresponding to the combination of at least one BTU and at least one STU and may include a plurality of data tones interleaved by a newly defined interleaver size.

Such a virtual allocation resource unit may be utilized for transmission based on SU (single) OFDMA. Further, all BTUs and all STUs defined in each bandwidth with respect to one STA may be allocated for transmission based on SU OFDMA.

The maximum number of STAs which may be simultaneously allocated resources in 20 MHz bandwidth may be 7. Each of the maximum 7 STAs may be allocated each of 2 BTUs and 5 STUs. The maximum number of STAs which may be allocated resources in 40 MHz bandwidth may be 14. Each of the maximum 14 STAs may be allocated each of 4 BTUs and 10 STUs. The maximum number of STAs which may be allocated resources in 80 MHz may be 29. Each of 29 STAs may be allocated each of 8 BTUs and 21 STUs. Further, the maximum number of STAs which may be allocated resources in the entire bandwidth may be limited to a number smaller than 29 (e.g., 20), and in such a case, the maximum 19 STAs may be simultaneously allocated resources based on the combination of 8 BTUs and 21 STUs in 80 MHz.

Hereinafter, a method of allocating pilot tones in a resource unit according to an exemplary embodiment of the present invention is described.

FIG. 3 is a conceptual diagram illustrating a method of allocating pilot tones of virtual allocation resource units according to an exemplary embodiment of the present invention.

FIG. 3 illustrates a method of allocating pilot tones in consideration of a position of pilot tones of each of at least one BTU and at least one STU corresponding to virtual allocation resource units in the virtual allocation resource units. The virtual allocation resource unit may not use OFDM numerology based on existing 242 tones in allocation of pilot tones.

Referring to FIG. 3, virtual allocation resource units of 242 tones may be allocated through virtualization, and virtual allocation resource units of 242 tones may correspond to a combination of 2 BTUs and 5 STUs. The BTU may be replaced with two STUs. That is, a band plan configured with total 9 STUs may be configured, and this may be used as an allocation resource of 242 tones.

A position of pilot tones included in virtual allocation resource units (e.g., 242 tones) according to an exemplary embodiment of the present invention may be the same as a position of an entire pilot tone or some pilot tones among a plurality of pilot tones of at least one BTU (e.g., 2 BTUs) and at least one STU (e.g., 5 STUs) corresponding to the virtual allocation resource units. When one BTU is replaced with two STUs, a position of pilot tones included in virtual allocation resource units may be the same as that of an entire pilot tone or some pilot tones among pilot tones of a plurality of STUs corresponding to the virtual allocation resource units.

In order words, a position set of pilot tones of virtual allocation resource units may be included in a position set of a plurality of pilot tones of at least one BTU (e.g., 2 BTUs) and at least one STU (e.g., 5 STUs) corresponding to the virtual allocation resource units.

For example, one BTU may include four pilot tones, and one STU may include two pilot tones. In such a case, the number of entire pilot tones of 2 BTUs and 5 STUs may be 18 (=2*4+5*2). A position of 8 pilot tones among 18 pilot tones and a position of 8 pilot tones included in virtual allocation resource units of 242 tones may be the same (or overlapped).

As shown in FIG. 3, a position of 4 pilot tones among 8 pilot tones included in 2 BTUs and a position of 4 pilot tones of virtual allocation resource units may be the same. 4 pilot tones included in 2 BTUs having the same position as that of pilot tones of virtual allocation resource units may be even pilot tones (or even index pilot tone). Alternatively, 4 pilot tones included in 2 BTUs having the same position as that of pilot tones of virtual allocation resource units may be odd pilot tones (or odd index pilot tones). Alternatively, 4 pilot tones included in 2 BTUs having the same position as that of pilot tones of virtual allocation resource units may be a combination of even index pilot tones/odd index pilot tones.

Even index pilot tones (or even pilot tones) are pilot tones positioned at the even number based on a leftmost tone or a rightmost tone among pilot tones included in resource units (BTU, STU), and odd index pilot tones (or odd pilot tones) may be pilot tones positioned at the odd number based on a specific frequency position among pilot tones included in resource units.

Further, a position of 4 pilot tones among 8 pilot tones included in 4 STUs and a position of 4 pilot tones of virtual allocation resource units may be the same. 4 pilot tones included in 4 STUs having the same position as that of pilot tones of virtual allocation resource units may be even index pilot tones. Alternatively, 4 pilot tones included in four STUs having the same position as that of pilot tones of virtual allocation resource units may be odd index pilot tones. Alternatively, 4 pilot tones included in 4 STUs having the same position as that of pilot tones of virtual allocation resource units may be a combination of even index pilot tones/odd index pilot tones.

A position of 2 pilot tones included in the remaining one STU may not the same as that of pilot tones of virtual allocation resource units. The remaining one STU may be a central STU positioned at the center on 242 tones.

That is, as described above, a position of 8 pilot tones among entire 18 pilot tones of 2 BTUs and 5 STUs and a position of 8 pilot tones included in virtual allocation resource units of 242 tones may be the same.

Further, when one BTU is replaced with two STUs, a position of 8 pilot tones among entire 18 pilot tones of 9 STUs and a position of 8 pilot tones included in virtual allocation resource units of 242 tones may be the same.

FIG. 4 is a conceptual diagram illustrating a method of allocating pilot tones of virtual allocation resource units according to an exemplary embodiment of the present invention.

FIG. 4 illustrates a method of allocating pilot tones in consideration of a position of pilot tones of each of at least one BTU and at least one STU corresponding to virtual allocation resource units in the virtual allocation resource units. That is, virtual allocation resource units may not use OFDM numerology based on existing 242 tones in allocation of pilot tones.

Referring to FIG. 4, virtual allocation resource units of 246 tones may be allocated through virtualization, and virtual allocation resource units of 246 tones may correspond to a combination of 3 BTUs and 3 STUs. Only 242 tones among virtual allocation resource unit of 246 tones are used as data tones and pilot tones, and 4 tones may be the remaining tones (or leftover tones). Therefore, for virtual allocation resource units of 246 tones, an interleaving procedure of data tones using interleaver of an existing 234 size may be used.

A position of pilot tones included in virtual allocation resource units (e.g., 246 tones) according to an exemplary embodiment of the present invention may be the same as that of an entire pilot tone or some pilot tones among a plurality of pilot tones of at least one BTU (e.g., 3 BTUs) and at least one STU (e.g., 3 STUs) corresponding to the virtual allocation resource units. In order words, a position set of pilot tones of virtual allocation resource units may be included in a position set of a plurality of pilot tones of at least one BTU (e.g., 3 BTUs) and at least one STU (e.g., 3 STUs) corresponding to the virtual allocation resource units.

For example, one BTU may include 4 pilot tones, and one STU may include two pilot tones. In such a case, the number of entire pilot tones of 3 BTUs and 3 STUs may be 18 (=3*4+3*2). A position of 8 pilot tones among 18 pilot tones and a position of 8 pilot tones included in virtual allocation resource units of 246 tones may be the same (or overlapped).

As shown in FIG. 4, a position of 6 pilot tones among 12 pilot tones included in 3 BTUs and a position of 6 pilot tones of virtual allocation resource units may be the same. 6 pilot tones included in 3 STUs having the same position as that of pilot tones of virtual allocation resource units may be even index pilot tones. Alternatively, 6 pilot tones included in 3 STUs having the same position as that of pilot tones of virtual allocation resource units may be odd index pilot tones. Alternatively, 6 pilot tones included in 3 BTUs having the same position as that of pilot tones of virtual allocation resource units may be a combination of even index pilot tones/odd index pilot tones.

Further, a position of 2 pilot tones among 4 pilot tones included in 2 STUs and a position of 2 pilot tones of virtual allocation resource units may be the same. 2 pilot tones included in 2 STUs having the same position as that of pilot tones of virtual allocation resource units may be even index pilot tones. Alternatively, 2 pilot tones included in 2 STUs having the same position as that of pilot tones of virtual allocation resource units may be odd index pilot tones. Alternatively, 2 pilot tones having the same position as that of pilot tones of virtual allocation resource units included in 2 STUs may be a combination of even index pilot tones/odd index pilot tones.

A position of 2 pilot tones included in the remaining one STU may not be overlapped with that of pilot tones of virtual allocation resource units. The remaining one STU may be a central STU positioned at the center on 246 tones.

That is, as described above, a position of 6 pilot tones among entire 18 pilot tones of 3 BTUs and 3 STUs and a position of 8 pilot tones included in virtual allocation resource units of 246 tones may be equally set.

As described in FIGS. 3 and 4, when position allocation of pilot tones is performed, a pilot position may be fixed instead of being not changed according to a change of allocated resource units and thus it may be convenient in implementation. For example, when pilot tones of virtual allocation resource units correspond to a portion of pilot tones included in allocatable BTUs and STUs within a bandwidth (In order words, when a position of pilot tones of virtual allocation resource units corresponds to a position of some of pilot tones included in allocatable BTUs and STUs within a bandwidth or when a position set of pilot tones of virtual allocation resource units is included in a position set of some pilot tones of pilot tones included in allocatable BTUs and STUs within a bandwidth), operation based on a training field (a long training field (LTF)) and a channel tracking operation may be easily implemented.

According to another exemplary embodiment of the present invention, a position of at least one pilot tone of a plurality of pilot tones included in allocatable BTUs and STUs within a bandwidth and a position of pilot tones of virtual allocation resource units may be equally set in consideration of an interpolation/extrapolation characteristic.

Alternatively, a position of at least one pilot tone of a plurality of pilot tones included in allocatable BTUs and STUs within a bandwidth and a position of pilot tones of virtual allocation resource units may be equally set in consideration of a structure (e.g., HE-long training field (LTF) structure generated based on IFFT of 4 times) of a training field supported in a wireless LAN system.

Similarly, when position allocation of such pilot tones is performed, a position of the pilot may be fixed instead of changing according to a change of allocated resource units and thus it may be convenient in implementation. For example, when pilot tones of virtual allocation resource units correspond to a portion of pilot tones included in allocatable BTUs and STUs within a bandwidth (or when a position of pilot tones of virtual allocation resource units corresponds to that of some pilot tones of pilot tones included in allocatable BTUs and STUs within a bandwidth), operation based on a training field (e.g., LTF) and a channel tracking operation may be easily implemented.

According to another exemplary embodiment of the present invention, a position of at least one pilot tone of a plurality of pilot tones included in allocatable BTUs and STUs within a bandwidth and a position of pilot tones of virtual allocation resource units may be overlapped in consideration of an interpolation/extrapolation characteristic.

Alternatively, a position of at least one pilot tone of a plurality of pilot tones included in allocatable BTUs and STUs within a bandwidth and a position of pilot tones of virtual allocation resource units may be overlapped in consideration of a structure (e.g., a HE-long training field (LTF) structure generated based on IFFT of 4 times) of a training field supported in a wireless LAN system.

Figure 5:
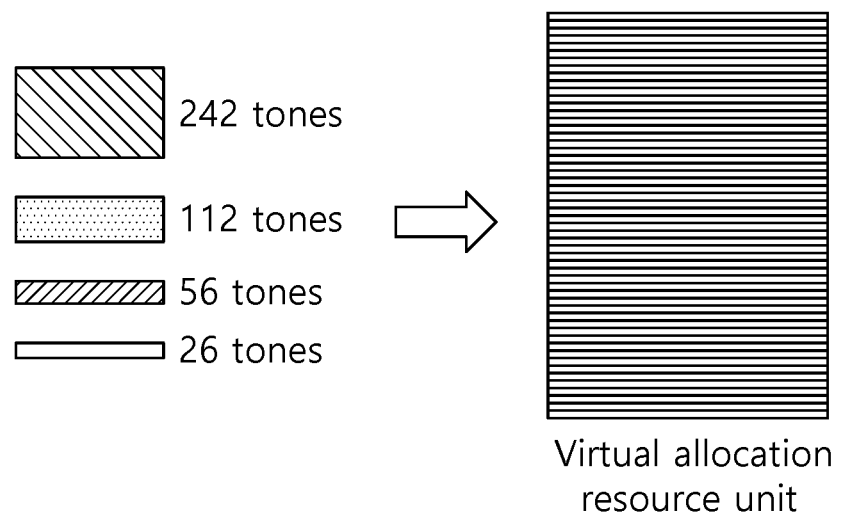
FIG. 5 is a conceptual diagram illustrating a method of configuring a virtual allocation resource unit according to an exemplary embodiment of the present invention.

FIG. 5 is a conceptual diagram illustrating a method of configuring virtual allocation resource units according to an exemplary embodiment of the present invention.

FIG. 5 illustrates various methods of constituting virtual allocation resource units by combining a resource allocation structure existing in an existing wireless LAN.

In an existing wireless LAN, resource allocation for an entire bandwidth was performed with granularity of 26 tones, 56 tones, 114 tones, and 242 tones. Resource units larger than 242 tones may be allocated based on a plurality of 242 tones (e.g., 242*2 or 242*4).

In an exemplary embodiment of the present invention, virtual allocation resource units may be configured using a combination of resource units defined in consideration of granularity used in such an existing wireless LAN. For example, resource units of 26 tones, resource units of 56 tones, resource units of 114 tones, or resource units of 242 tones may be defined to configure virtual allocation resource units.

When such a virtual allocation method is used, wireless LAN communication may be performed using a hardware/software design of an existing wireless LAN system without a new hardware/software design for operation of an STA that receives allocation of virtual allocation resource units.

Hereinafter, in an exemplary embodiment of the present invention, various examples that configure virtual allocation resource units based on a combination of resource units defined in consideration of granularity used in an existing wireless LAN are described. In order words, a method for supporting a resource unit of a large unit through virtual allocation of resource units defined in consideration of granularity used in an existing wireless LAN is described.

For example, 242 tones (234 data tones+8 pilot tones) defined based on 2 resource units of 56 tones and 5 resource units of 26 tones may be defined as virtual allocation resource units. In virtual allocation resource units of 242 tones, a pilot position may be fixed or may be separately defined, as described in FIGS. 2 and 3.

For another example, virtual allocation resource units of a size larger than 242 tones may be defined based on a combination of resource units of various sizes used in an existing wireless LAN. When a size of the virtual allocation resource unit is larger than 242, the remaining tones, except for 242 tones may be leftover tones.

For example, when a size of the virtual allocation resource unit is 250, the virtual allocation resource unit may correspond to a combination of resource units of various sizes used in a wireless LAN as follows.

(1) 4 second resource units of 56 tones and 1 resource unit of 26 tones (56*4+26*1=250)

(2) While 8 leftover tones are remained, 242 are allocated.

(3) 9 resource units of 26 tones and 16 leftover tones (4) 3 resource units of 56 tones and 3 resource units of 26 tones (56*3+26*3=246) and 4 leftover tones (5) 2 second resource units of 56 tones and 5 resource units of 26 tones (56*2+26*5=242) and 8 leftover tones Further, according to an exemplary embodiment of the present invention, resource units of 56 tones may be divided to be used as 2 second resource units of 26 tones and 4 leftover tones. Alternatively, 2 second resource units of 56 tones may be divided to be used as 4 second resource units of 26 tones and 8 leftover tones.

The leftover tones may be positioned between a plurality of resource units of 26 tones generated by dividing resource units of 56 tones. For example, resource units of 56 tones are divided and when 2 second resource units of 26 tones and 4 leftover tones are generated, 4 leftover tones may be positioned between resource units of 26 tones in a form of 1/26/1/1/26/1.

A plurality of resource units of 26 tones generated by dividing resource units of 56 tones form a pair to be positioned on a frequency axis, and leftover tones may be positioned at a periphery of resource units of 26 tones forming a pair. For example, resource units of 56 tones are divided and when 2 second resource units of 26 tones and 4 leftover tones are generated, 4 leftover tones may be positioned at a periphery of resource units of 26 tones that form a pair in a form of 1/1/26/26/1/1.

Further, according to an exemplary embodiment of the present invention, when 2 second resource units of 26 tones (data tones of 24 tones and 2 pilot tones) are allocated, interleaving of data tones (data tones of 24 tones*2) of 48 tones included in 2 second resource units of 26 tones may be performed based on an interleaver of 48 size supporting in an existing wireless LAN system.

Further, according to an exemplary embodiment of the present invention, when a size of the virtual allocation resource unit is 242 tones, the virtual allocation resource unit may correspond to 9 resource units of 26 tones and 8 leftover tones. In this case, 8 leftover tones each may be positioned between 9 resource units of 26 tones. That is, the virtual allocation resource unit may have an allocation structure of resource units of 26/1/26/1/26/1/26/1/26/1/26/1/26/1/26/1/26.

In the resource structure of virtual allocation resource units, subordinate resource units of 1/26/1/26/1 may have a size of 55 tones (=26*2+3). For a subordinate resource unit of such 55 tones, data tones of 52 tones and 3 pilot tones may be allocated, and for a subordinate resource unit of 55 tones, data interleaver of 52 size is reused and thus interleaving of data tones included in the subordinate resource unit of 55 tones may be performed.

The number of pilot tones included in subordinate resource units of 55 tones included in the virtual allocation resource unit is 3 and the number of pilot tones included in existing resource units of 56 tones is 4. That is, the number of pilot tones included in subordinate resource units of 55 tones included in the virtual allocation resource units may be smaller by 1 than that of pilot tones included in existing resource units of 56 tones. Therefore, pilot tones may be newly defined, 1 pilot tone may be punctured in existing radio resource units of 56 tones, or a position of one pilot tone among pilot tones defined in existing resource units of 26 tones in subordinate resource units (1/26/1/26/1) may be punctured and configured.

Further, according to another exemplary embodiment of the present invention, only a resource unit of 26 tones is considered as a physical resource unit, and it may be assumed that a resource unit of a size larger than that of 26 tones is allocated as virtual allocation resource units. In such a case, a resource unit may be allocated according to a size of a bandwidth as follows.

When a size of the bandwidth is 20 MHz and when only a resource unit of 26 tones is considered as a physical resource unit, an allocation structure of resource units may be defined as follows.

(1) left guard/26/1/26/1/26/1/26/1/13/DC/13/1/26/1/26/1/26/1/26/right guard (2) left guard/26*4/13/DC/13/26*4/right guard (3) left guard/26/1/26/1/1/26/1/26/13/DC/13/26/1/26/1/1/26/1/26/right guard When a size of a bandwidth is 40 MHz, when only a resource unit of 26 tones is considered as a physical resource unit, and when virtual allocation resources of 242 tones correspond to 9 resource units of 26 tones and 8 leftover tones, an allocation structure of resource units may be defined as follows.

(1) left guard/242/DC/242/right guard (2) When only resource units of 26 tones are used, in a bandwidth 40 MHz, maximum 19 resource units (26*19=494 tones) of 26 tones may be allocated. Therefore, by adding 16 leftover tones (8 leftover tones*2) and 10 additional tones within 2 virtual allocation resource units of 242 tones, an additional resource unit of 26 tones may be further defined. 10 additional tones may be generated by reducing tones allocated to the left guard tones, the right guard tones, and the DC tones.

That is, in an allocation structure of resource units of the left guard/242/DC/242/right guard, by collecting tones spread at each of 2 virtual allocation resource units of 242 tones, the left guard tones, the DC tones, and the right guard tones, additional resource units of 26 tones may virtually be used. Alternatively, an allocation structure of resource units of left guard/26*9/13/DC/13/26*9/right guard in which additional resource units of 26 tones are divided about the DC tones may be defined.

When a size of a bandwidth is 80 MHz, an allocation structure of resource units may be defined as follows.

(1) left guard/242/242/13/DC/13/242/242/right guard (242*4+26=994).

(2) By adding 26 leftover tones among 32 (4*8) leftover tones included in 4 virtual allocation resource units of 242 tones, additional resource units of 26 tones may be used. Alternatively, in a bandwidth 80 MHz, because maximum 38 resource units (26*38=988 tones) of 26 tones may be allocated, an allocation structure of resource units of left guard/26*19/DC/26*19/right guard may be defined.

Hereinafter, an allocation structure of resource units according to another exemplary embodiment of the present invention is described.

When a size of the bandwidth is 20 MHz, an allocation structure of resource units may be defined as follows.

(1) 20 MHz: left guard/26/56/26/13/DC/13/26/56/26/right guard

The number of tones available in the bandwidth 20 MHz may be 242 tones, resource units of 56 tones may be 1) used as resource units of 56 tones or 2) may be divided into resource units of 26 tones and leftover tones in 1/26/1/1/26/1 and used. In such a case, an interleaver of a size 52 defined for interleaving of existing resource units of 56 tones may be used. When resource units of 56 tones are divided into resource units of 26 tones and leftover tones, a position of pilot tones may be replaced with a position of pilot tones defined in resource units of 26 tones.

Alternatively, when resource units of 56 tones are divided into resource units of 26 tones and leftover tones, a position of pilot tones of existing defined resource units of 56 tones and a position of pilot tones of existing defined resource units of 26 tones may be divided to be the same (or to overlap). For example, a position set of a plurality of first pilot tones included in resource units of 56 tones and a position set of a plurality of second pilot tones included in two resource units of 26 tones generated based on segment of resource units of 56 tones may be the same. Pilot spacing of resource units of 56 tones may be defined to 14 tones, and pilot spacing of resource units of 26 tones may be defined to 14 tones.

Alternatively, when resource units of 56 tones are divided into resource units of 26 tones and leftover tones, for two divided resource units of 26 tones (24 data tones and two pilot tones), an interleaver of an existing 48 size is used and thus interleaving of 48 data tones (24*2) included in two resource units of 26 tones may be performed.

When a size of the bandwidth is 40 MHz, an allocation structure of resource units may be defined as follows.

(1) left guard/242/DC/242/right guard (242*2=484)
(2) left guard/246/DC/246/right guard (246*2=492)

In a bandwidth 40 MHz, when an allocation structure of resource units is (1) left guard/242/DC/242/right guard, 242 are virtual allocation resource units of 242 tones. Virtual allocation resource units of 242 tones may correspond to an allocation structure 26/1/26/1/26/1/26/1/26/1/26/1/26/1/26 of a resource unit, and a position of pilot tones may correspond to a position of a leftover tone 1. Alternatively, a virtual allocation resource structure may correspond to an allocation structure 26/1/26/1/1/26/1/26/26/1/26/1/1/26/1/26 of resource units, and a position of pilot tones may correspond to a position of a leftover tone 1.

That is, when virtual allocation resource units of 242 tones are generated, a position of pilot tones may be determined in consideration of a position of resource units of 26 tones corresponding to virtual allocation resource units of 242 tones and a position of leftover tones.

Alternatively, pilot tones of virtual allocation resource units of 242 tones may be configured by puncturing a portion of pilot tones existing at resource units of 56 tones or resource units of 26 tones.

Alternatively, virtual allocation resource units of 242 tones may correspond to an allocation structure of 2 second resource units of 56 tones and 5 resource units of 26 tones. In this case, resource units of 56 tones may be divided into resource units of 26 tones to be replaced with 1/26/1/1/26/1.

In a bandwidth 40 MHz, when an allocation structure of resource units is (2) left guard/246/DC/246/right guard, virtual allocation resource units of 246 tones may correspond to an allocation structure (56/26/56/26/56/26) of 3 resource units of 56 tones and 3 resource units of 26 tones. In this case, resource units of 56 tones may be divided into resource units of 26 tones to be replaced with 1/26/1/1/26/1.

When virtual allocation resource units of 246 tones are allocated to the STA, only 242 tones may be used and the remaining 4 tones (=246 tones-242 tones) may have an allocation structure of resource units of null/null/242/null/null or 242/null/null/null/null defined to null tones. Alternatively, 4 null tones may be inserted between 242 tones. For example, 4 null tones each may be inserted in an equal gap between 242 tones.

Pilot tones of virtual allocation resource units of 246 tones are defined on 242 tones, except for null tones. A position of pilot tones on 242 tones, except for null tones may be determined based on a method of determining pilot tones in virtual allocation resource units of the foregoing 242 tones of FIGS. 3 and 4. That is, a position of pilot tones of virtual allocation resource units of 242 tones may be determined in consideration of a position of pilot tones of resource units of 56 tones and resource units of 26 tones corresponding to virtual allocation resource units of 242 tones.

When a size of resource units allocated to the STA is larger than 242 tones, 2 virtual allocation resource units of 242 tones may be allocated or 2 virtual allocation resource units of 246 tones may be allocated. Alternatively, resource units larger than 242 tones are allocated through a combination of other resource units and frequency segment is performed and thus an existing interleaver size may be reused. Alternatively, a size of resource units larger than 242 tones may not be allocated to the STA.

When a size of the bandwidth is 80 MHz, an allocation structure of resource units may be defined as follows.

(1) left guard/242/242/13/DC/13/242/242/right guard (242*4+26=994)
(2) left guard/250/250/DC/250/250/right guard (250*4=1000)

As described above, resource units of 242 tones may include 9 resource units of 26 tones. That is, in an allocation structure of resource units of (1), 37 resource units of 26 tones may be allocated on a bandwidth.

Virtual allocation resource units of 250 tones may correspond to an allocation structure (e.g., 56/56/26/56/56) of 4 second resource units of 56 tones and one resource unit of 26 tones. In this case, resource units of 56 tones may be divided into resource units of 26 tones to be replaced with 1/26/1/1/26/1.

When virtual allocation resource units of 250 tones are allocated to the STA, only 242 tones may be used and the remaining 8 tones may have an allocation structure of resource units of null/null/null/null/242/null/null/null/null or null/null/null/null/null/null/null/null/242 defined to null tones. Alternatively, 8 null tones may be inserted between 242 tones. For example, four tones each may be inserted in an equal gap between 242 tones.

Pilot tones of virtual allocation resource units of 250 tones are defined on 242 tones, except for null tones. A position of pilot tones on 242 tones, except for null tones may be the same as that of pilot tones in the foregoing virtual allocation resource units of 242 tones of FIGS. 3 and 4.

When a size of resource units allocated to the STA is larger than 242 tones, two virtual allocation resource units of 242 tones are allocated, two virtual allocation resource units of 250 tones may be allocated, or 4 virtual allocation resource units of 242 tones may be allocated. Alternatively, resource units larger than 242 tones may be allocated through a combination of other resource units, frequency segment is performed and thus an existing interleaver size may be reused.

According to an exemplary embodiment of the present invention, when a plurality of leftover tones are added to constitute resource units, information about leftover tones constituting resource units may be signaled. For example, in virtual allocation resource units, signaling on whether any leftover tone among leftover tones positioned between resource units of 26 tones corresponding to 242 tones or at a periphery of resource units of 26 tones is used for configuring one resource unit may be performed.

Specifically, it may be instructed whether any leftover tone of 8 leftover tones through 8 bit signaling of each of 8 leftover tones between 9 resource units of 26 tones corresponding to 242 tones is used for configuring one resource unit. When 8 bit signaling is 01110000, 8 bit signaling may instruct to configure resource units of 55 tones with addition of a third resource unit of 26 tones, a fourth resource unit of 26 tones, and three leftover tones.

In the foregoing exemplary embodiment of the present invention, a position of leftover tones positioned between resource units of 26 tones or use of leftover tones may be different in downlink and uplink.

Hereinafter, a method of allocating a resource based on a regular resource unit (RRU) according to an exemplary embodiment of the present invention is described.

As described above, when an allocation structure of resource units is defined in a bandwidth by extending resource units (e.g., 26 tones, 56 tones, 114 tones, 242 tones) corresponding to a bandwidth size used in an existing wireless LAN system, wireless LAN communication may be performed using a hardware/software design of an existing wireless LAN system without a new hardware/software design for operation of the STA.

A size of the RRU may be fixed or may increase according to a size of the bandwidth. In order to increase packing efficiency and to solve an interleaver size problem and an overhead problem of pilot tones in a bandwidth of a large size, virtual allocation resource units defined based on virtual allocation (virtualization) may be used.

Figure 6:
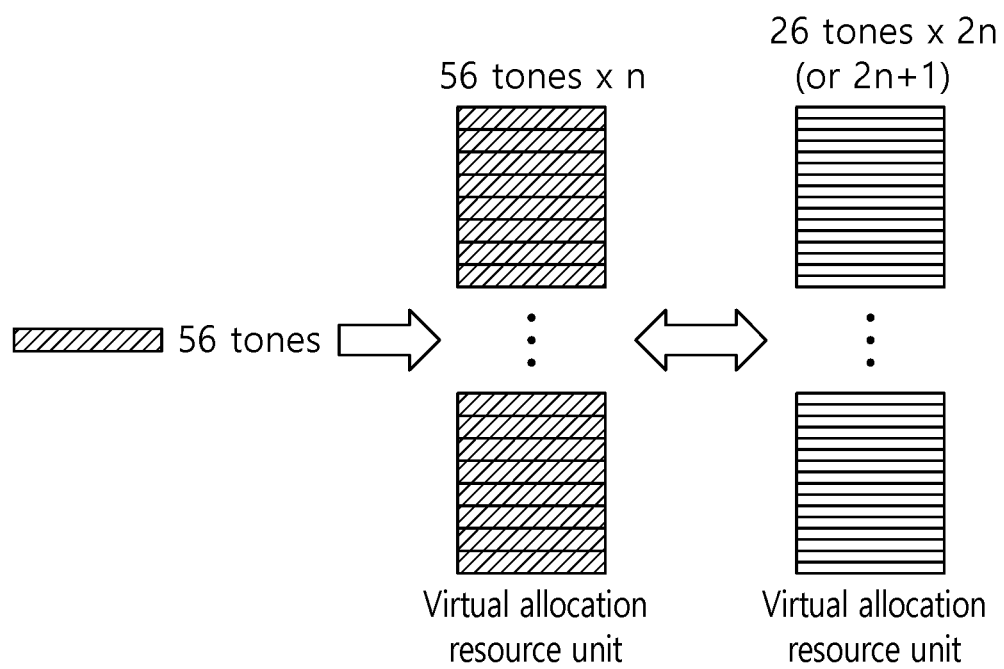
FIG. 6 is a conceptual diagram illustrating an allocation structure of resource units defined by extending an RRU on a bandwidth according to an exemplary embodiment of the present invention.

FIG. 6 is a conceptual diagram illustrating an allocation structure of resource units defined by extending an RRU on a bandwidth according to an exemplary embodiment of the present invention.

In FIG. 6, it is assumed that a size of an RRU is 56 tones. Resource units of 56 tones are the same as basic OFDM numerology used in 20 MHz in an existing wireless LAN system. Therefore, a configuration defined for an existing STA operation, as in an interleaver of a size 52 used in an existing wireless LAN system may be reused.

In a bandwidth 80 MHz, 1024 inverse fast Fourier transform (IFFT)/fast Fourier transform (FFT) is performed, and when the number of each of the left guard tone/DC/right guard tone is (6 tones, 5 tones, 5 tones), total 1008 available tones (or usable tones) may exist. On 1008 available tones, an RRU, which is a resource unit of 56 tones may be allocated to 18 pieces (1008=56*18).

Resource units of 56 tones may be divided into two 28 tones, and in such a case, 36 resource units of 28 tones may be allocated on available 1008 tones. 9 resource units of 28 tones are 252 tones, and in such a case, an allocation structure of resource units of the left guard/252/252/DC/252/252/right guard may be defined. As described above, resource units of 242 tones may include 9 resource units of 26 tones, and on a bandwidth 80 MHz, 37 resource units of 26 tones may be allocated.

Therefore, it may be analyzed that resource units of 28 tones into which resource units of 56 tones are divided are used as an RRU or it may be analyzed that resource units of 56 tones in which resource units of 28 tones are combined into two are defined to an RRU.

As described above, according to an exemplary embodiment of the present invention, in order to increase packing efficiency and to solve an overhead problem of pilot tones and an interleaver size problem upon allocating a resource unit on a large bandwidth, virtual allocation resource units may be used.

For example, when virtual allocation resource units of 252 tones corresponding to 9 resource units of 28 tones are allocated to the STA, resource units of existing 242 tones may be used. In order to use resource units of existing 242 tones, virtual allocation resource units of 252 tones may include 242 tones and 10 leftover tones. A position of 10 leftover tones may be determined by various objects. For example, xxxxx 242 xxxxx (x means 1 leftover tone), leftover tones may be positioned on virtual allocation resource units of 252 tones with xxxx121xxx121xxx. In a case of xxxx121xxx121xxx, in order to support a low-end STA that supports a bandwidth 20 MHz, DC tones may be additionally inserted at an intermediate portion.

Alternatively, total 8 pilot tones by one pilot tone among two pilot tones existing at each of 8 resource units of 28 tones among 9 resource units of 28 tones are used as leftover tones, and in the remaining one resource unit of 28 tones, entire two pilot tones may be used as leftover tones. That is, 10 pilot tones included in 9 resource units of 28 tones are replaced with 10 leftover tones and thus 10 leftover tones may be effectively set while using a position of existing pilot tones to the maximum.

For example, an allocation structure of resource units of [28(1) 28(1) 28(1) 28(1) 28(2) 28(1) 28(1) 28(1) 28(1)] may exist. In this case, a numeral within a parenthesis may be the number of pilot tones used as a leftover tone in resource units of each 28 tone.

In 9 resource units of 28 tones, the remaining 8 pilot tones that are not used as leftover tones may be used as pilot tones for 242 tones (or virtual allocation resource units of 252 tones).

According to another exemplary embodiment of the present invention, entire 18 pilot tones (2 tones*9) positioned at 9 resource units of 28 tones are used as pilot tones, and by using the remaining 234 tones (252 tones-18 tones) among 252 tones as data tones, interleaving based on an interleaver of an existing 234 size may be performed.

It may be advantageous in implementing a wireless LAN system to fix a position of pilot tones for virtual allocation resource units having a size larger than that of 242 tones. Therefore, a position of pilot tones of virtual allocation resource units may be defined such that a position of some pilot tones or entire pilot tones of resource units of a small size corresponding to virtual allocation resource units corresponds to that of pilot tones of virtual allocation resource units. In order words, a set of pilot tones of a plurality of resource units included in virtual allocation resource units may include a set of pilot tones of virtual allocation resource units.

When a position and the number of pilot tones are set such that the number of data tones becomes 234 tones in virtual allocation resource units, an interleaver of an existing 234 size may be reused. For example, virtual allocation resource units of 250 tones may correspond to four resource units of 56 tones and one resource unit of 26 tones. For virtual allocation resource units of 250 tones, 16 pilot tones existing in four resource units of 56 tones may be used as pilot tones, and data tones of the remaining 234 tones (250 tones-16 tones) may be interleaved by reusing an interleaver of an existing 234 size. That is, virtual allocation resource units of 250 tones may be configured with data tones of 234 tones and pilot tones of 16 tones.

For another example, virtual allocation resource units of 246 tones may correspond to three resource units of 56 tones and three resource units of 26 tones. For virtual allocation resource units of 246 tones, 12 pilot tones existing at three resource units of 56 tones may be used as pilot tones, and data tones of the remaining 234 tones (246 tones-12 tones) may be interleaved by reusing an interleaver of an existing 234 size. That is, virtual allocation resource units of 246 tones may be configured with data tones of 234 tones and pilot tones of 12 tones.

Figure 7:
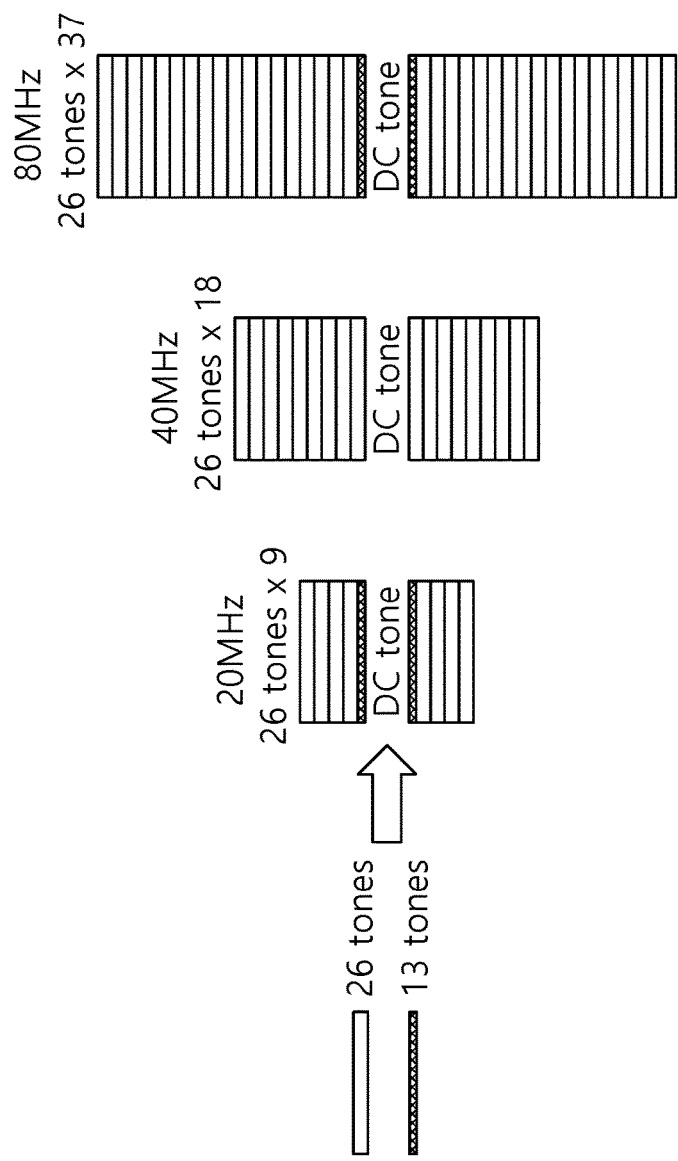
FIG. 7 is a conceptual diagram illustrating an allocation structure of resource units defined by extending an RRU on a bandwidth according to an exemplary embodiment of the present invention.

FIG. 7 is a conceptual diagram illustrating an allocation structure of resource units defined by extending an RRU on a bandwidth according to an exemplary embodiment of the present invention.

In FIG. 7, it is assumed that a size of an RRU is 26 tones. Resource units of 26 tones are the same as basic OFDM numerology used in 20 MHz in an existing wireless LAN system. Therefore, a configuration defined for operation of an existing STA, as in an interleaver of a size 24 used in an existing wireless LAN system may be reused.

According to a size of a bandwidth, the number of left guard tones, DC tones, and right guard tones may be as follows.

For a bandwidth 20 MHz, the left guard tones of 6 tones, the DC tones of 3 tones, and the right guard tones of 5 tones may be allocated.

For a bandwidth 40 MHz, the left guard tones of 6 tones, the DC tones of 3 tones or 5 tones, and the right guard tones of 5 tones may be allocated.

For a bandwidth 80 MHz, the left guard tones of 12 tones or 11 tones, the DC tones of 3 tones or 5 tones, and the right guard tones of 11 tones or 10 tones may be allocated.

As described above, when the left guard tones, the DC tones, the right guard tones are allocated, the number of available tones may be 242 tones for the bandwidth 20 MHz, 496 tones or 498 tones for a bandwidth 40 MHz, and 996 tones, 998 tones or 1000 tones for a bandwidth 80 MHz.

In such a case, resource units of allocatable 26 tones on available tones on each band basis may be as follows.

For a bandwidth 20 MHz, 9 resource units (234 tones=9*26 tones) of 26 tones may be allocated. For a bandwidth 40 MHz, 19 (18+1) resource units of 26 tones (468 tones+26 tones=494 tones) may be allocated. For a bandwidth 80 MHz, 38 (36+2) resource units (936 tones+52 tones=988 tones) of 26 tones may be allocated.

Resource units of 26 tones may be allocated at a fixed position for each bandwidth.

Hereinafter, in an exemplary embodiment of the present invention, allocation on a bandwidth of resource units of 26 tones according to each bandwidth is described.

For allocation on a bandwidth of a resource unit of 26 tones according to each bandwidth, the following virtual allocation resource units (or basic structure) of 242 tones may be defined. Virtual allocation resource units of 242 tones may include 9 resource units of 26 tones and 8 leftover tones. In virtual allocation resource units of 242 tones, an allocation structure of resource units of 26 tones may be 26/x/26/x/26/x/26/x/26/x/26/x/26/x/26/x/26. Hereinafter, x may instruct a leftover tone.

For virtual allocation resource units of 242 tones, a position of a pilot may be variously determined. For example, 8 pilot tones may be positioned at a position x corresponding to leftover tones, and the remaining 234 tones (26 tones*9) may be used as a data tone. Alternatively, a pilot tone may be defined in virtual allocation resource units of 242 tones using 8 pilot tones among 18 pilot tones, which are a set of two pilot tones existing at each of 9 resource units of 26 tones.

According to an exemplary embodiment of the present invention, for a bandwidth 20 MHz, virtual allocation resource units of 242 tones may be divided into a half and allocated based on DC tones. In 242 tones, one resource unit of 26 tones positioned at an intermediate portion among 9 resource units of 26 tones corresponding to virtual allocation resource units may be divided into division resource units of 13 tones and allocated.

For example, virtual allocation resource units of 242 tones may be divided and allocated into 6(left guard tones)/26/x/26/x/26/x/26/x/13/3(DC tones)/13/x/26/x/26/x/26/x/26/5 (right guard tones) based on DC tones.

Here, in 242 tones, for convenience, an allocation structure of resource units of 26/x/26/x/26/x/26/x/13/3(DC tones)/13/x/26/x/26/x/26/x/26 including three DC tones may be represented with a term of a structure of 245 tones.

According to an exemplary embodiment of the present invention, for a bandwidth 40 MHz, virtual allocation resource units of 242 tones may be symmetrically positioned at both sides based on DC tones.

For example, an allocation structure of resource units of 6 (left guard tones)/242/5(DC tones)/242/5(right guard tones) may be used for a bandwidth 40 MHz.

As described above, when 6 tones are used for the left guard tones, when 5 tones are used for the DC tones, and when 6 tones are used for the right guard tones, 12 tones may remain as leftover tones. Therefore, in an allocation structure of resource units of 6/242/5/242/5, 12 leftover tones may be symmetrically positioned. The following description, in an allocation structure of resource units of 6/242/5/242/5, allocation of 12 leftover tones is described.

(1) Because interference in guard tones and DC tones may be large, the leftover tones may be positioned at a periphery of the guard tones and the DC tones, as in 6/3(leftover tones)/242/3(leftover tones)/5/3(leftover tones)/242/3(leftover tones)/5. Leftover tones adjacent to a periphery of the guard tones and/or the DC tones may be analyzed to DC tones or guard tones.

(2) In order to maintain the number of guard tones to be the same as that in the bandwidth 20 MHz, leftover tones may be positioned at a periphery of the DC tones, as in 6/242/6(leftover tones)/5/6(leftover tones)/242/5.

(3) In order to maintain the number of guard tones to be the same as that in a bandwidth 80 MHz, leftover tones may be positioned at a periphery of the left guard tones/the right guard tones, as in 6/6(leftover tones)/242/5/242/6(leftover tones)/5.

(4) The leftover tones may be added to virtual allocation resource units of 242 tones, as in 6/242+6 (leftover tones)/5/242+6(leftover tones)/5. A plurality of leftover tones each may be positioned between 9 resource units of 26 tones constituting virtual allocation resource units of 242 tones.

According to another exemplary embodiment of the present invention, for a bandwidth 40 MHz, resource units of 26 tones may be symmetrically disposed by 9.5 pieces based on DC tones. As described above, when 6 tones are used for the left guard tones, when 5 tones are used for the DC tones, and when 6 tones are used for the right guard tones, two tones may remain as the leftover tones. Therefore, in an allocation structure of resource units of 6/26*9/13/5/13/26*9/5, two leftover tones may be positioned as follows.

(1) 6/26*9/13/1(leftover tones)/5/1(leftover tones)/13/26*9/5

(2) 6/1(leftover tones)/26*9/13/5/13/26*9/1(leftover tones)/5

As in (1), 2 leftover tones and 5 DC tones may be analyzed to 7 DC tones.

Further, virtual allocation resource units of 242 tones may be allocated at both sides based on DC tones. That is, virtual allocation resource units of 242 tones may be allocated to resource units (26 tones*9+13 tones) of 247 tones, which are 9.5 resource units of 26 tones. In order to allocate virtual allocation resource units of 242 tones, allocation of virtual allocation resource units of 242 tones is explicitly instructed. Alternatively, when resource units of 26 tones are allocated to 9 pieces (or 10 pieces), it may be implicitly instructed that virtual allocation resource units of 242 tones are allocated. A position of virtual allocation resource units of 242 tones and a position of pilot tones included in virtual allocation resource units of 242 tones may be variously determined as described in the present invention.

According to another exemplary embodiment of the present invention, for a bandwidth 40 MHz, the foregoing 245 tone structure of 242 tones+DC (3 tones) allocated in the bandwidth 20 MHz may be symmetrically positioned based on DC tones. The 245 tone structure may be an allocation structure of resource units of 26/x/26/x/26/x/26/x/13/3(DC tone)/13/x/26/x/26/x/26/x/26.

As described above, when 6 tones are allocated to the left guard tones, when 5 tones are allocated to the DC tones, and when 6 tones are allocated to the right guard tones, 6 tones may remain as the leftover tones. Therefore, in an allocation structure of resource units of 6/245/5/245/5, 6 leftover tones may be positioned as follows.

(1) In order to maintain the number of guard tones to be the same as that in the bandwidth 20 MHz, as in 6/245/3(leftover tones)/5/3(leftover tones)/245/5, 6 leftover tones may be positioned at a periphery of the DC tones. It may be analyzed that 6 leftover tones are added to 5 DC tones to be 11 DC tones.

(2) As the leftover tones are adjacent to guard tones, the leftover tones may be positioned as in 6/3(leftover tones)/245/5/245/3(leftover tones)/5. That is, it may be analyzed to the increase of the number of guard tones.

(3) As the leftover tones are adjacent to guard tones and DC tones, the leftover tones may be positioned as in 6/2(leftover tones)/245/1(leftover tones)/5/1(leftover tones)/245/2(leftover tones)/5.

In a structure of 245 tones, 8 leftover tones and 3 DC tones may exist, in two structures of 245 tones included in an allocation structure of resource units of 6/245/5/245/5, 8 leftover tones and 3 DC tones may be added to be 22 tones. When four leftover tones are additionally added to 22 tones, resource units of 26 tones may be generated.

According to another exemplary embodiment of the present invention, for a bandwidth 40 MHz, a resource allocation structure in the foregoing bandwidth 20 MH may be repeatedly used. At an intermediate portion, a portion in which the right guard tones and the left guard tones are added may be used as DC tones. A resource allocation structure in the foregoing bandwidth 20 MHz may be 6/245/5, and when a resource allocation structure in the bandwidth 20 MHz is repeated, the resource allocation structure may be 6/245/5/6/245/5. In this case, 5/6, which is a portion in which the right guard tones and the left guard tones are added may be DC tones.

According to an exemplary embodiment of the present invention, for a bandwidth 80 MHz, an allocation structure of resource units defined in the bandwidth 40 MHz may be repeatedly used. A portion in which the right guard tones and the left guard tones are added may be used as DC tones.

According to another exemplary embodiment of the present invention, for a bandwidth 80 MHz, a structure X_40, which is a structure, except for guard tones in an allocation structure of resource units in the bandwidth 40 MHz may be symmetrically positioned at both sides of DC tones. In this case, when the number of available tones is insufficient, in the structure X_40, DC tones may be excluded.

According to another exemplary embodiment of the present invention, for a bandwidth 80 MHz, resource units of 26 tones may be symmetrically allocated by 19 pieces at both sides based on DC tones. When the left guard tones are 11 pieces, when the DC tones are 3 pieces, and when the right guard tones are 10 pieces, 12 leftover tones may remain. Therefore, in a structure of 11(left guard tones)/26*19/3(DC tones)/26*19/10(right guard tones), 12 leftover tones may be positioned as follows.

(1) 11/26*19/6(leftover tones)/3/6(leftover tones)/26*19/10. In this case, 15 tones in which 12 leftover tones and 3 DC tones are added may be analyzed to DC tones.

(2) 11/6(leftover tones)/26*19/3/26*19/6(leftover tones)/10. It may be analyzed that when leftover tones are coupled, the left guard tones and the right guard tones are increased.

(3) 11/26*9/26*9/13/3/13/26*9/26*9/10. When leftover tones are inserted into intermediate portions, an allocation structure of resource units of 11/26*9/2(leftover tones)/26*9/2(leftover tones)/13/2(leftover tones)/3/2(leftover tones)/13/2(leftover tones)/26*9/2(leftover tones)/26*9/10 may exist.

Further, two virtual allocation resource units of 242 tones may be allocated at both sides based on DC tones. One resource unit of 26 tones, except for 18 resource units of 26 tones among 19 resource units of 26 tones included in two virtual allocation resource units of 242 tones may be divided to be used for allocation of virtual allocation resources units of 242 tones of both sides. That is, for resource units (26 tones*9+13 tones) of 247 tones, which are 9.5 resource units of 26 tones, virtual allocation resource units of 242 tones may be allocated. In order to allocate virtual allocation resource units of 242 tones, allocation of virtual allocation resource units of 242 tones may be explicitly instructed. Alternatively, when resource units of 26 tones are allocated to 9 pieces (or 10 pieces), allocation of virtual allocation resource units of 242 tones may be implicitly instructed. A position of virtual allocation resource units of 242 tones and a position of pilot tones included in virtual allocation resource units of 242 tones may be variously determined as described in the present invention.

According to another exemplary embodiment of the present invention, for a bandwidth 80 MHz, a structure of 245 tones may be symmetrically positioned twice at both sides based on DC tones. When the left guard tones are 11 pieces, when the DC tones are 3 pieces, and when the right guard tones are 10 pieces, an allocation structure of resource units of 11(left guard tones)/245/245/3(DC tones)/245/245/10 (right guard tones) may be defined, and at an intermediate portion, 20 leftover tones may be positioned.

According to another exemplary embodiment of the present invention, for a bandwidth 80 MHz, a structure of 242 tones may be symmetrically positioned twice at both sides based on DC tones. When the left guard tones are 11 pieces, when the DC tones are 3 pieces, and when the right guard tones are 10 pieces, an allocation structure of resource units of 11(left guard tones)/242/242/3(DC tones)/242/242/10 (right guard tones) may be defined, and at an intermediate portion, 32 leftover tones may be positioned. When leftover tones are added, additional one resource unit of 26 tones may be further defined.

According to another exemplary embodiment of the present invention, for a bandwidth 80 MHz, an allocation structure of resource units in which an allocation structure of resource units defined in the bandwidth 20 MHz is continued four times may be defined. When an allocation structure of resource units defined in the bandwidth 20 MHz is continued, a portion in which the right guard tones and the left guard tones are added may be used as DC tones. While unnecessary DC tones are reduced, the left guard tones and the right guard tones may be set to satisfy requirements of a bandwidth 80 MHz.

Figure 8:
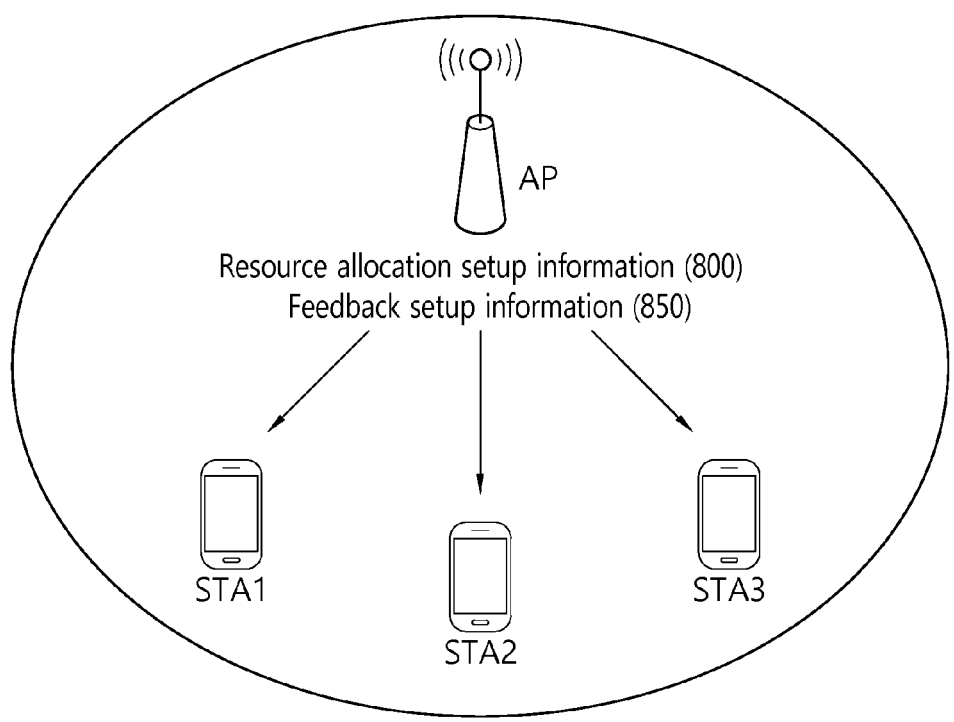
FIG. 8 is a conceptual diagram illustrating a channel feedback method according to resource unit allocation according to an exemplary embodiment of the present invention.

FIG. 8 is a conceptual diagram illustrating a channel feedback method according to resource unit allocation according to an exemplary embodiment of the present invention.

According to the foregoing exemplary embodiment of the present invention, a small tone unit (STU) and a basic tone unit (BTU) can simultaneously exist based on resource units of 26 tones and virtual allocation resource units of 242 tones. Resource units of 26 tones may correspond to the STU, and resource units of 242 tones may correspond to the BTU.

Further, according to operation, an allocation structure of resource units may be defined with only the STU or flexibility that defines an allocation structure of resource units with only the BTU may be supported. Particularly, while maintaining a position of pilot tones to the maximum, convenience in implementation may be sought to the maximum.

In an exemplary embodiment of the present invention, allocation of virtual allocation resource units of continued 242 tones is generally described, but virtual allocation resource units of 242 tones are divided and 121 tones may be positioned at both sides based on DC tones. That is, a discontinuous plurality of resource units may configure virtual allocation resource units of 242 tones.

Further, channel state information may be fed back based on resource units of 26 tones, but in some case, channel state information may be fed back based on virtual allocation resource units (e.g., 242 tones) or may be fed back based on a portion (e.g., 121 tones) of virtual allocation resource units.

For example, the AP may transmit feedback setup information 850 to a plurality of STAs, and a plurality of STAs may perform channel feedback based on feedback setup information. The feedback setup information may instruct whether to perform channel feedback information based on first resource units (e.g., 26 tones) or second resource units (e.g., 242 tones), and the channel feedback information may include channel feedback information corresponding to the first resource units or channel feedback information corresponding to the second resource units according to feedback setup information.

Further, channel allocation to virtual allocation resource units of 242 tones may be generally performed using channel allocation based on resource units of 26 tones, but in some case, channel allocation may be performed based on virtual allocation resource units of 242 tones.

Referring to FIG. 8, the AP may transmit resource allocation setup information 800, which is information about whether to perform channel allocation based on first resource units (e.g., resource units of 26 tones) or second resource units (e.g., resource units of 242 tones).

For example, the AP may signal to the STA that channel allocation is performed based on virtual allocation resource units of 242 tones. For example, in a bandwidth 80 MHz, because 4 virtual allocation resource units of 242 tones may be allocated, the AP may signal to the STA that a channel is allocated based on virtual allocation resource units of 242 tones. For example, the AP may notify the STA that channel allocation is used based on virtual allocation resource units of 242 tones through a signal field (e.g., HE-SIG).

Channel allocation based on such virtual allocation resource units of 242 tones may be set by necessity of the AP. For example, the AP may determine whether to perform channel allocation based on virtual allocation resource units of 242 tones in consideration of an STA load, a traffic characteristic, and a capability of an STA.

Alternatively, the STA may request to the AP to allocate a resource based on a size of a specific resource unit. For example, the STA may request channel allocation based on virtual allocation resource units of 242 tones to the AP.

In the above-described various cases, a structure of resource units of 26 tones may be the same as a structure used in existing IEEE 802.11ah or may be different from a structure used in existing IEEE 802.11ah. For example, resource units of 26 tones may include two pilot tones having pilot spacing of 14 tones, may not include pilot tones, or may include a pilot defined to the different number at different positions.

In the foregoing description, as an illustration, virtual allocation resource units of 242 tones are described, but virtual allocation resource units of different sizes instead of virtual allocation resource units of 242 tones may be used.

Further, according to an exemplary embodiment of the present invention, for an entire bandwidth, at a periphery of DC tones, an allocation structure of resource units may be defined such that resource units of 26 tones are divided to be division resource units of 13 tones. For convenience of description, leftover tones are not represented.

For example, for a bandwidth 20 MHz, an allocation structure of resource units of 26/26/26/26/13/DC/13/26/26/26/26 may be used. That is, 4.5 resource units of 26 tones may be symmetrically allocated at both sides based on DC tones.

For a bandwidth 40 MHz, resource units of 26 tones may be symmetrically allocated by 9.5 pieces at both sides based on DC tones in a form of 26*9/13/DC/13/26*9.

Alternatively, for a bandwidth 40 MHz, by allocating resource units based on DC tones in a form of 13/26*4/13/26*4/13/DC/13/26*4/13/26*4/13, an allocation structure of resource units may be defined in a structure in which 26*4 of 4 pieces exist.

Virtual allocation resource units of 242 tones may be defined on 26*9+13=247 tones.

For a bandwidth 80 MHz, an allocation structure of resource units of 26*9/13/26*9/13/DC/13/26*9/13/26*9 may be defined. That is, resource units of 26 tones may be symmetrically allocated by 19 based on DC tones, and an allocation structure of resource units may be defined in which 19 resource units of 26 tones are symmetrically allocated to two by 9.5.

Alternatively, in a bandwidth 80 MHz, 9 resource units of 26 tones may be divided into a repetition structure of four resource units of 26 tones and division resource units of 13 tones. In such a case, four resource units of 26 tones may exist in 8 pieces.

Further, in a bandwidth 80 MHz, virtual allocation resource units of 242 tones may be defined on 26*9+13=247 tones.

Hereinafter, in an exemplary embodiment of the present invention, a method of effectively allocating resource units according to the number of STAs (or users) is described.

As described above, resource units of 26 tones and division resource units of 13 tones may be defined and used. When only some resource units are not allocated by a specific object, it may be advantageous in implementation and signaling not to allocate division resource units of 13 tones.

For example, in a bandwidth 20 MHz, when resources are allocated to two STAs, 4 second resource units of 26 tones may be allocated to each of two STAs. Alternatively, 4 second resource units of 26 tones and division resource units of 13 tones may be allocated to two STAs, respectively.

In a bandwidth 40 MHz, when resources are allocated to four STAs, four resource units of 26 tones may be allocated to four STAs, respectively. Alternatively, four resource units of 26 tones and division resource units of 13 tones may be allocated to four STAs, respectively.

In a bandwidth 80 MHz, when resources are allocated to 8 STAs, four resource units of 26 tones may be allocated to 8 STAs, respectively. Alternatively, four resource units of 26 tones and division resource units of 13 tones may be allocated to 8 STAs, respectively.

Figure 9:
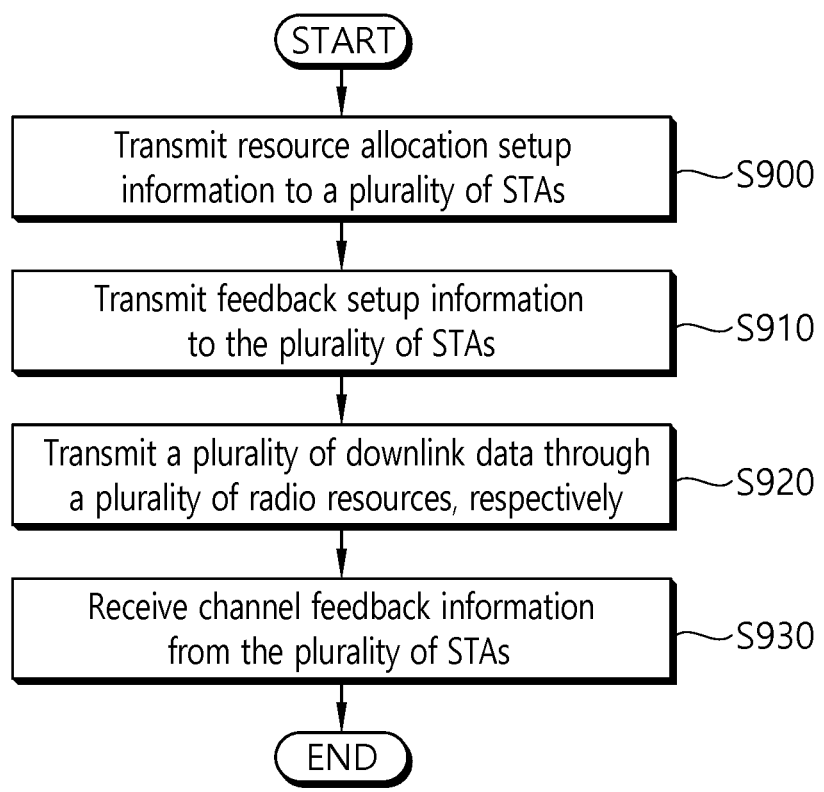
FIG. 9 is a flowchart illustrating a method of scheduling a radio resource according to an exemplary embodiment of the present invention.

FIG. 9 is a flowchart illustrating a method of scheduling a radio resource according to an exemplary embodiment of the present invention.

FIG. 9 illustrates a method in which an AP schedules a radio resource and receives feedback information based on a BTU and/or an STU.

Referring to FIG. 9, the AP may transmit resource allocation setup information to a plurality of STAs (step S900).

The resource allocation setup information may be information that instructs whether to perform scheduling of each of a plurality of radio resources based on first resource units or second resource units. For example, the first resource units have a size of 26 tones, and the second resource units have a size of 242 tones. The second resource units may include 9 first resource units and 8 leftover tones.

As described above, when a plurality of radio resources each are allocated on a bandwidth 20 MHz, a plurality of radio resources each may be allocated on 9 first resource units.

When a plurality of radio resources each are allocated on a bandwidth 40 MHz, a plurality of radio resources each are allocated on 18 first resource units and when a plurality of radio resources each are allocated on a bandwidth 80 MHz, a plurality of radio resources each may be allocated on 27 first resource units.

Alternatively, when a plurality of radio resources each are allocated on a bandwidth 40 MHz, the plurality of radio resources each are allocated on 2 second resource units, and when the plurality of radio resources each are allocated on a bandwidth 80 MHz, the plurality of radio resources each may be allocated on 4 second resource units.

The AP may transmit feedback setup information to the plurality of STAs (step S910).

The feedback setup information instructs whether to perform channel feedback information based on the first resource units or the second resource units, and the channel feedback information may include channel feedback information corresponding to the first resource units or channel feedback information corresponding to the second resource units according to feedback setup information.

The AP may transmit a plurality of downlink data to the plurality of STAs through a plurality of radio resources, respectively (step S920).

The AP may receive channel feedback information about the plurality of radio resources from the plurality of STAs, respectively (step S930).

The channel feedback information may include channel feedback information corresponding to first resource units or channel feedback information corresponding to second resource units according to feedback setup information.

Figure 10:
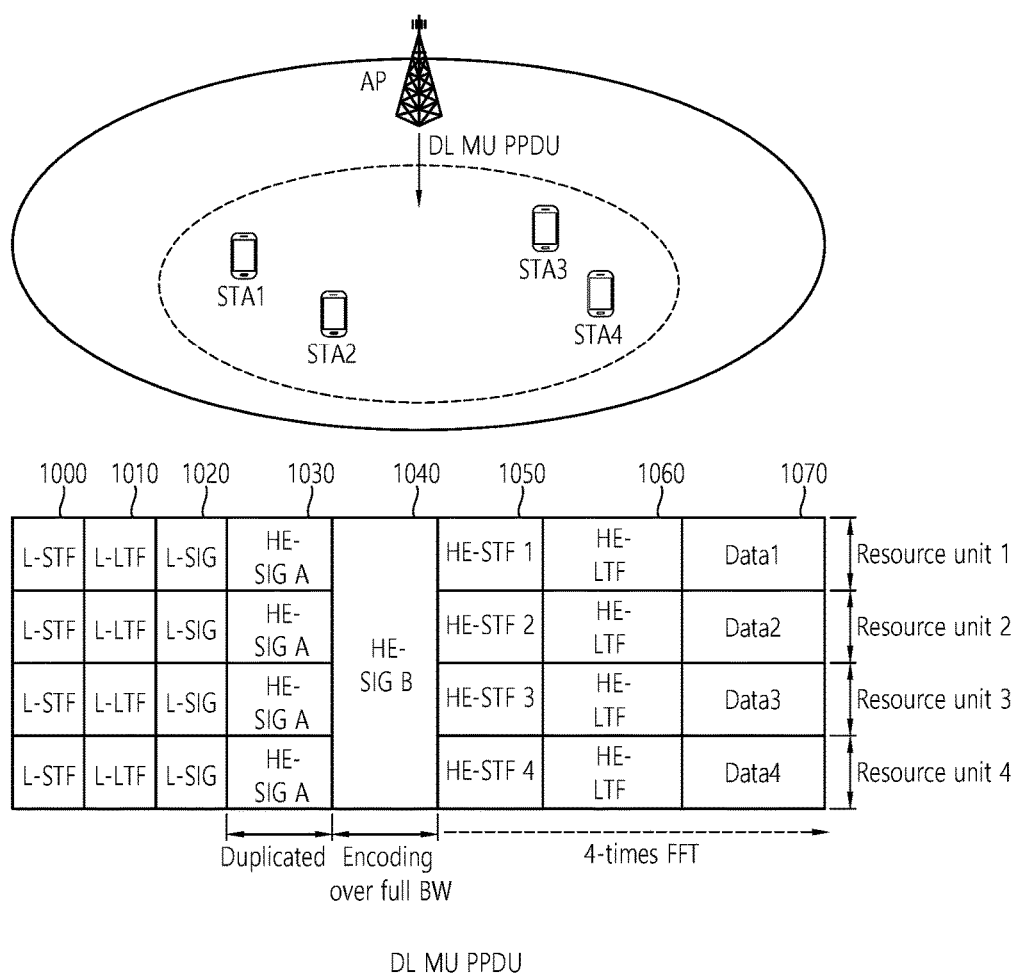
FIG. 10 is a conceptual diagram illustrating a DL MU PPDU format according to an exemplary embodiment of the present invention.

FIG. 10 is a conceptual diagram illustrating a DL MU PPDU format according to an exemplary embodiment of the present invention.

FIG. 10 illustrates a DL MU PPDU format transmitted based on OFDMA by an AP according to an exemplary embodiment of the present invention.

Referring to FIG. 10, a PPDU header of the DL MU PPDU may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), and a data field (or a MAC payload). The PPDU header may be divided into a legacy part from a PHY header to the L-SIG and a high efficiency (HE) part after the L-SIG.

An L-STF 1000 may include a short training orthogonal frequency division multiplexing (OFDM) symbol. An L-STF 800 may be used for frame detection, automatic gain control (AGC), diversity detection, and coarse frequency/time synchronization.

An L-LTF 1010 may include a long training orthogonal frequency division multiplexing (OFDM) symbol. An L-LTF 810 may be used for fine frequency/time synchronization and channel estimation.

In order to transmit control information, an L-SIG 1020 may be used. An L-SIG 820 may include information about a data rate and a data length.

An HE-SIG A 1030 may include information for instructing an STA to receive a DL MU PPDU. For example, the HE-SIG A 1030 may include an identifier of a specific STA (or AP) to receive a PPDU and information for instructing a group of a specific STA. Further, when the DL MU PPDU is transmitted based on OFDMA or a MIMO, the HE-SIG A 1030 may include resource allocation information for receiving the DL MU PPDU of the STA.

Further, the HE-SIG A 1030 may include color bits information for BSS identification information, bandwidth information, a tail bit, a CRC bit, modulation and coding scheme (MCS) information of an HE-SIG B 1040, symbol number information for the HE-SIG B 1040, and cyclic prefix (CP)(or guard interval (GI)) length information.

The HE-SIG B 1040 may include a tail bit and information about a length MCS of a physical layer service data unit (PSDU) of each STA. Further, the HE-SIG B 1040 may include information about an STA to receive a PPDU and resource allocation information based on OFDMA (or MU-MIMO information). When OFDMA based resource allocation information (or MU-MIMO related information) is included in the HE-SIG B 1040, resource allocation information may not be included in the HE-SIG A 1030.

An HE-SIG A 1050 or an HE-SIG B 1060 may include resource allocation information such as resource allocation information (or virtual resource allocation information) of each of a plurality of STAs and information about whether resource allocation is performed using only a BTU or an STU.

On the DL MU PPDU, a previous field of the HE-SIG B 1040 may be transmitted in a duplicated form in each of different transmission resources. In the HE-SIG B 1040, the HE-SIG B 1040 transmitted from a partial resource unit (e.g., resource unit1, resource unit2) is an independent field including individual information, and the HE-SIG B 1040 transmitted from the remaining resource units (e.g., resource unit3, resource unit4) may be a duplicated format of the HE-SIG B 1040 transmitted from other resource units (e.g., resource unit1, resource unit2). Alternatively, the HE-SIG B 1040 may be transmitted in an encoded form on an entire transmission resource. A field after the HE-SIG B 1040 may include individual information for each of a plurality of STAs that receive a PPDU.

The HE-STF 1050 may be used for enhancing automatic gain control estimation in a multiple input multiple output (MIMO) environment or an OFDMA environment.

Specifically, STA1 may receive HE-STF1 transmitted from the AP through the resource unit1 and perform synchronization, channel tracking/estimation, and AGC to decode a data field1. Similarly, STA2 may receive HE-STF2 transmitted from the AP through the resource unit2 and perform synchronization, channel tracking/estimation, and AGC to decode a data field2. STA3 may receive HE-STF3 transmitted from the AP through a resource unit3 and perform synchronization, channel tracking/estimation, and AGC to decode a data field3. STA4 may receive HE-STF4 transmitted from the AP through a resource unit4 and perform synchronization, channel tracking/estimation, and AGC to decode a data field4.

In order to estimate a channel in a MIMO environment or an OFDMA environment, the HE-LTF 1060 may be used.

A size of IFFT applied to the HE-STF 1050 and a field after the HE-STF 1050 and a size of IFFT applied to a field before the HE-STF 1050 may be different. For example, a size of IFFT applied to the HE-STF 1050 and a field after the HE-STF 1050 may be larger by four times than that of IFFT applied to a field before the HE-STF 1050. The STA may receive the HE-SIG A 1030 and receive an instruction on reception of a downlink PPDU based on the HE-SIG A 1030. In such a case, the STA may perform decoding based on an FFT size changed from the HE-STF 1050 and a field after the HE-STF 1050. In contrast, when the STA does not receive an instruction on reception of a downlink PPDU based on the HE-SIG A 1030, the STA may stop decoding and set a network allocation vector (NAV). A cyclic prefix (CP) of the HE-STF 1050 may have a size larger than that of other fields, and for such a CP segment, the STA may perform decoding of a downlink PPDU by changing an FFT size.

An access point (AP) may allocate a plurality of radio resources for a plurality of stations (STAs), respectively on an entire bandwidth and transmit a physical protocol data unit (PPDU) to a plurality of STAs through a plurality of radio resources, respectively. As described above, information about allocation of a plurality of radio resources for a plurality of STAs, respectively may be included in the HE-SIG A 1050 or the HE-SIG B 1060.

In this case, a plurality of radio resources each may be a combination of a plurality of radio resources units (BTU, STU) defined to different sizes on a frequency axis. As described above, a resource allocation combination may be a combination of at least one allocatable resource unit on an entire available tone according to a size of a bandwidth.

Figure 11:
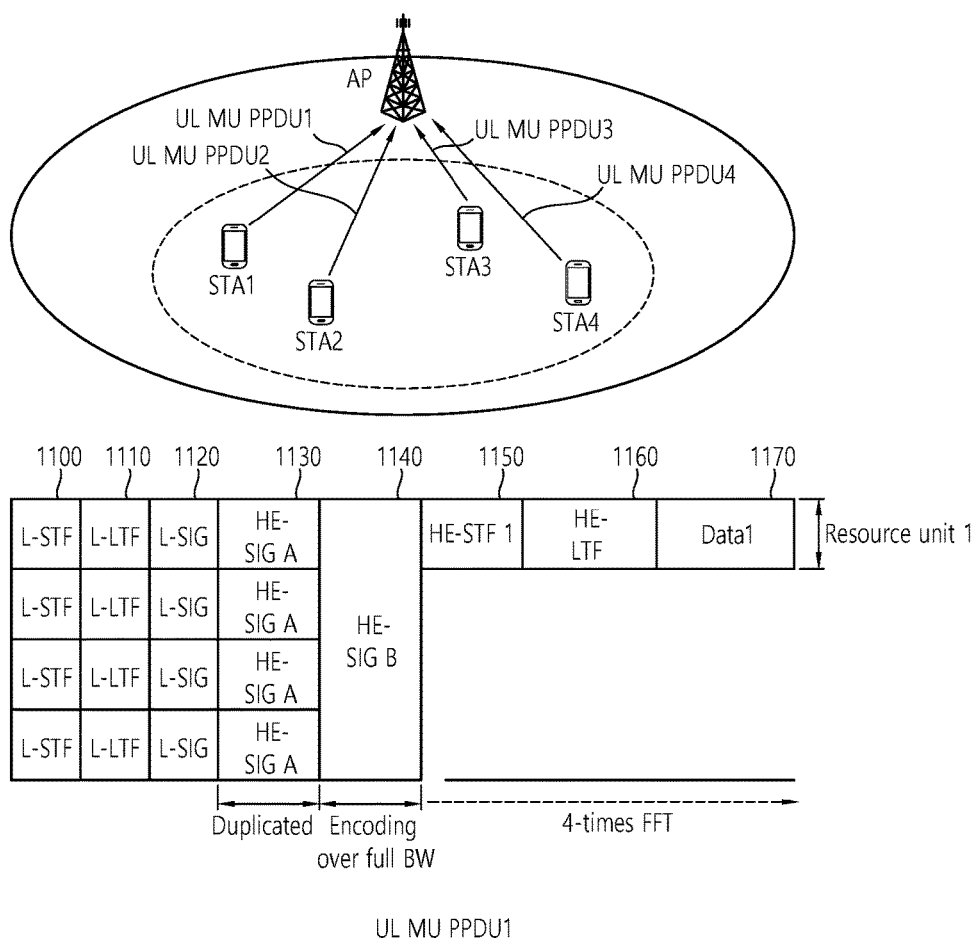
FIG. 11 is a conceptual diagram illustrating transmission of an UL MU PPDU according to an exemplary embodiment of the present invention.

FIG. 11 is a conceptual diagram illustrating transmission of an UL MU PPDU according to an exemplary embodiment of the present invention.

Referring to FIG. 11, a plurality of STAs may transmit an UL MU PPDU to the AP based on UL MU OFDMA.

An L-STF 1100, an L-LTF 1110, an L-SIG 1120, an HE-SIG A 1130, and an HE-SIG B 1140 may perform a function of FIG. 8. Information included in a signal field (the L-SIG 1120, the HE-SIG A 1130, and the HE-SIG B 1140) may be generated based on information included in a signal field of a received DL MU PPDU.

STA1 may perform uplink transmission up to the HE-SIG B 1140 through an entire bandwidth and perform uplink transmission through an allocated bandwidth after a HE-STF 1150. The STA1 may transmit an uplink frame based on an UL MU PPDU through an allocated bandwidth (e.g., resource unit1). The AP may allocate an uplink resource of a plurality of STAs each based on a DL MU PPDU (e.g., HE-SIG A/B), and the plurality of STAs each may receive allocation of an uplink resource to transmit an UL MU PPDU.

Figure 12:
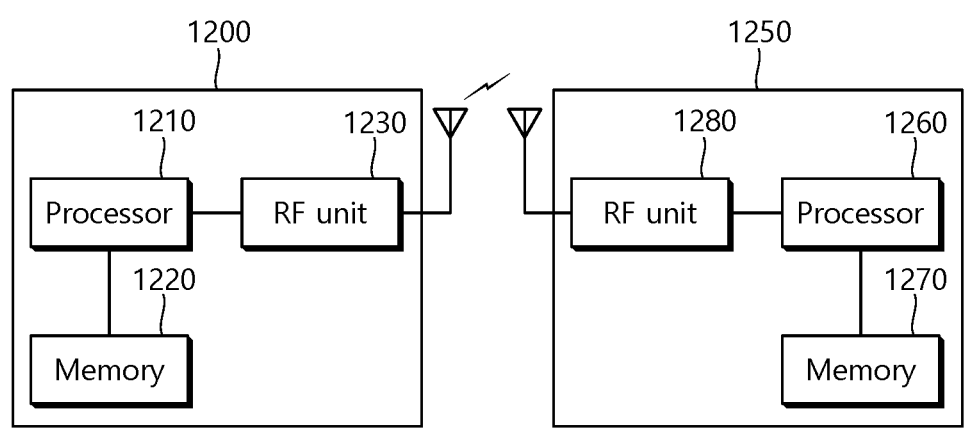
FIG. 12 is a block diagram illustrating a wireless apparatus to which an exemplary embodiment of the present invention may be applied.

FIG. 12 is a block diagram illustrating a wireless apparatus to which an exemplary embodiment of the present invention may be applied.

Referring to FIG. 12, a wireless apparatus 1200 is an STA that can implement the above-described exemplary embodiment, and may be an AP 1200 or a non-AP station (or STA) 1250.

The AP 1200 includes a processor 1210, a memory 1220, and a Radio Frequency (RF) unit 1230.

The RF unit 1230 may be connected to the processor 1210 to transmit/receive a wireless signal.

The processor 1210 may implement a function, a process and/or a method suggested in the present invention. For example, the processor 1210 may perform operation of the AP according to the foregoing exemplary embodiment of the present invention. The processor may perform operation of the AP described in the exemplary embodiment of FIGS. 1 to 11.

For example, the processor 1210 may transmit resource allocation setup information to a plurality of stations (STAs), allocate a plurality of radio resources to a plurality of STAs, respectively based on first resource units or second resource units based on resource allocation setup information, transmit a plurality of downlink data to a plurality of STAs through a plurality of radio resources, respectively, and receive channel feedback information of a plurality of radio resources from a plurality of STAs, respectively.

The resource allocation setup information may instruct whether to perform scheduling of each of a plurality of radio resources based on first resource units or second resource units, and the second resource units may have a size larger than that of the first resource units. For example, the first resource units have a size of 26 tones, the second resource units have a size of 242 tones, and the second resource units may include 9 first resource units and 8 leftover tones.

The STA 1250 includes a processor 1260, a memory 1270, and a Radio Frequency (RF) unit 1280.

The RF unit 1280 may be connected to the processor 1260 to transmit/receive a wireless signal.

The processor 1260 may implement a function, a process, and/or a method suggested in the present invention. For example, the processor 1260 may perform operation of the STA according to the foregoing exemplary embodiment of the present invention. The processor may perform operation of the STA in the exemplary embodiment of FIGS. 1 to 11.

For example, the processor 1260 may receive scheduling of a radio resource based on resource allocation setup information received from the AP and transmit channel feedback information to the AP based on feedback setup information received from the AP.

The processors 1210 and 1260 may include an application-specific integrated circuit (ASIC), another chipset, a logic circuit, a data processing apparatus and/or a converter that mutually converts a baseband signal and wireless signal. The memories 1220 and 1270 may include a read-only memory (ROM), a random access memory (RAM), a flash memory, a memory card, a storage medium and/or another storage apparatus. The RF units 1230 and 1280 may include at least one antenna that transmits and/or receives a wireless signal.

When an exemplary embodiment is implemented with software, the above-described technique may be implemented with a module (process, function) that performs the above-described function. The module may be stored at the memories 1220 and 1270 and be executed by the processors 1210 and 1260. The memories 1220 and 1270 may exist at the inside or the outside of the processors 1210 and 1260 and may be connected to the processors 1210 and 1260, respectively, by well-known various means.

What is claimed is:

1. A method of allocating a plurality of radio resources for downlink multi-user (DL MU) transmission in a wireless local area network (WLAN), the method comprising:
    transmitting, by an access point (AP), resource allocation setup information to a plurality of stations (STAs), wherein the resource allocation setup information indicates whether the plurality of radio resources corresponding to an entire bandwidth for the plurality of STAs are allocated based on first resource units or second resource units, and wherein the second resource units have a size larger than that of the first resource units;
    allocating, by the AP, the plurality of radio resources for the plurality of STAs individually according to the resource allocation setup information;
    transmitting, by the AP, a downlink physical (PHY) protocol data unit (PPDU) including a plurality of downlink data to the plurality of STAs,
    wherein the downlink PPDU includes resource allocation information to indicate the plurality of radio resources individually allocated for the plurality of STAs,
    wherein the resource allocation information is included in a PHY header of the downlink PPDU, and
    wherein the plurality of downlink data are individually transmitted through the plurality of radio resources; and
    receiving, by the AP, channel feedback information related to the plurality of radio resources from the plurality of STAs respectively.

2. The method of claim 1, further comprising transmitting, by the AP, feedback setup information to the plurality of STAs,
    wherein the feedback setup information instructs whether to perform the channel feedback information based on the first resource units or the second resource units, and
    wherein the channel feedback information includes channel feedback information corresponding to the first resource units or channel feedback information corresponding to the second resource units according to the feedback setup information.

3. The method of claim 1, wherein each of the first resource units has a size of 26 tones,
    wherein each of the second resource units has a size of 242 tones, and
    wherein each of the second resource units corresponds to 9 first resource units and 8 leftover tones.

4. The method of claim 1, wherein each of the first resource units has a size of 26 tones,
    wherein the plurality of radio resources are allocated on 9 first resource units, when the plurality of radio resources are allocated on a bandwidth 20 MHz,
    wherein the plurality of radio resources are allocated on 18 first resource units, when the plurality of radio resources each are allocated on a bandwidth 40 MHz, and
    wherein the plurality of radio resources are allocated on 37 first resource units, when the plurality of radio resources are allocated on a bandwidth 80 MHz.

5. The method of claim 1, wherein each of the second resource units has a size of 242 tones,
    wherein the plurality of radio resources are allocated on 2 second resource units, when the plurality of radio resources are allocated on a bandwidth 40 MHz, and
    wherein the plurality of radio resources are allocated on 4 second resource units, when the plurality of radio resources are allocated on a bandwidth 80 MHz.

6. An access point (AP) that allocates a plurality of radio resources for downlink multi-user (DL MU) transmission in a wireless local area network (WLAN), the AP comprising:
    a radio frequency (RF) unit that transmits and receives a wireless signal; and
    a processor operatively connected to the RF unit and configured to:
    transmit resource allocation setup information to a plurality of stations (STAs),
        wherein the resource allocation setup information indicates whether the plurality of radio resources corresponding to an entire bandwidth for the plurality of STAs are allocated based on first resource units or second resource units, and
        wherein the second resource units have a size larger than that of the first resource units;
        allocate the plurality of radio resources for the plurality of STAs, individually according to the resource allocation setup information;
        transmit a downlink physical (PHY) protocol data unit (PPDU) including a plurality of downlink data to the plurality of STAs,
        wherein the downlink PPDU includes resource allocation information to indicate the plurality of radio resources individually allocated for the plurality of STAs,
        wherein the resource allocation information is included in a PHY header of the downlink PPDU, and
        wherein the plurality of downlink data are individually transmitted through the plurality of radio resources; and
        receive channel feedback information related to the plurality of radio resources from the plurality of STAs respectively.

7. The AP of claim 6, wherein the processor is further configured to transmit feedback setup information to the plurality of STAs,
    wherein the feedback setup information instructs whether to perform the channel feedback information based on the first resource units or the second resource units, and
    wherein the channel feedback information includes channel feedback information corresponding to the first resource units or channel feedback information corresponding to the second resource units according to the feedback setup information.

8. The AP of claim 6, wherein each of the first resource units has a size of 26 tones,
    wherein each of the second resource units has a size of 242 tones, and
    wherein each of the second resource units corresponds to 9 first resource units and 8 leftover tones.

9. The AP of claim 6, wherein each of the first resource units has a size of 26 tones, and
wherein the plurality of radio resources are allocated on 9 first resource units, when the plurality of radio resources are allocated on a bandwidth 20 MHz,
wherein the plurality of radio resources are allocated on 18 first resource units, when the plurality of radio resources are allocated on a bandwidth 40 MHz, and
wherein the plurality of radio resources are allocated on 37 first resource units, when the plurality of radio resources are allocated on a bandwidth 80 MHz.

10. The AP of claim 6, wherein each of the second resource units has a size of 242 tones,
wherein the plurality of radio resources are allocated on 2 second resource units, when the plurality of radio resources each are allocated on a bandwidth 40 MHz, and
wherein the plurality of radio resources each are allocated on 4 second resource units, when the plurality of radio resources each are allocated on a bandwidth 80 MHz.

* * * * *